(12) United States Patent
Whitefield et al.

(10) Patent No.: US 10,100,965 B2
(45) Date of Patent: Oct. 16, 2018

(54) NON-METALLIC VERTEBRAE BEND RESTRICTOR AND VERTEBRAE END PIECE

(71) Applicant: WHITEFIELD PLASTICS CORPORATION, Houston, TX (US)

(72) Inventors: William H. Whitefield, Houston, TX (US); Brandon Carringer, Houston, TX (US)

(73) Assignee: WHITEFIELD PLASTICS CORPORATION, Houston, TX (US)

(*) Notice: Subject to any disclaimer, the term of this patent is extended or adjusted under 35 U.S.C. 154(b) by 0 days.

(21) Appl. No.: 15/718,195

(22) Filed: Sep. 28, 2017

(65) Prior Publication Data
US 2018/0209576 A1     Jul. 26, 2018

Related U.S. Application Data

(63) Continuation of application No. PCT/US2017/014951, filed on Jan. 25, 2017.

(51) Int. Cl.
| | |
|---|---|
| *F16L 11/00* | (2006.01) |
| *F16L 57/02* | (2006.01) |
| *F16L 11/18* | (2006.01) |
| *H02G 9/12* | (2006.01) |

(52) U.S. Cl.
CPC ............... *F16L 57/02* (2013.01); *F16L 11/18* (2013.01); *H02G 9/12* (2013.01)

(58) Field of Classification Search
CPC ........... F16L 57/02; F16L 1/123; H02G 9/065
USPC ................................................. 138/119, 120
See application file for complete search history.

(56) References Cited

U.S. PATENT DOCUMENTS

| | | | |
|---|---|---|---|
| 5,215,338 A * | 6/1993 | Kimura ................... | F16L 3/015 138/120 |
| 6,035,997 A | 3/2000 | Heninger et al. | |
| 6,173,836 B1 | 1/2001 | Cooper | |
| 6,408,888 B1 * | 6/2002 | Baumer .................. | F16G 13/16 138/120 |
| 8,607,826 B2 | 12/2013 | Krohn et al. | |

(Continued)

OTHER PUBLICATIONS

International Search Report of the International Searching Authority (USPTO) for international application PCT/US2017/014951 dated Aug. 24, 2017.

(Continued)

*Primary Examiner* — James Hook
(74) *Attorney, Agent, or Firm* — Basil M. Angelo; Angelo Mikeska PLLC

(57) ABSTRACT

A non-metallic clip connection system includes a non-metallic clip having a substantially rectangular base portion, a first longitudinal flared wing portion, and a second longitudinal flared wing portion, wherein a plurality of edges of the clip along a path of insertion are beveled or radiused. The non-metallic clip connection system also includes a first non-metallic member having a first portion of a non-metallic clip receiver and a second non-metallic member having a second portion of the non-metallic clip receiver. The first non-metallic member is secured to the second non-metallic member by inserting the non-metallic clip in the non-metallic clip receiver. A non-metallic vertebrae bend restrictor and a non-metallic vertebrae end piece may use a non-metallic clip connection system.

31 Claims, 35 Drawing Sheets

(56) References Cited

U.S. PATENT DOCUMENTS

| | | | |
|---|---|---|---|
| 8,961,017 B2* | 2/2015 | Muilenburg | B23P 6/00 138/167 |
| 2002/0117229 A1* | 8/2002 | Luettgen | E03C 1/021 138/120 |
| 2007/0029081 A1* | 2/2007 | Shaw | E21B 17/017 166/241.3 |
| 2010/0228295 A1 | 9/2010 | Whitefield | |
| 2011/0089679 A1* | 4/2011 | Meredith | F16L 1/26 285/15 |
| 2012/0241037 A1* | 9/2012 | Lund | E21B 17/017 138/106 |
| 2012/0304447 A1 | 12/2012 | Smith et al. | |
| 2014/0377010 A1 | 12/2014 | Belkom | |

OTHER PUBLICATIONS

Written Opinion of the International Searching Authority (USPTO) for international application PCT/US2017/014951 dated Aug. 24, 2017.

Lankhorst Mouldings, Lankhorst Boltless Bend Restrictor brochure retrieved from https://www.lm-offshore.com/files/4/5/9/5/LM%20Boltless%20Bend%20Restrictors.pdf on Jan. 25, 2017, publication date unknown.

* cited by examiner

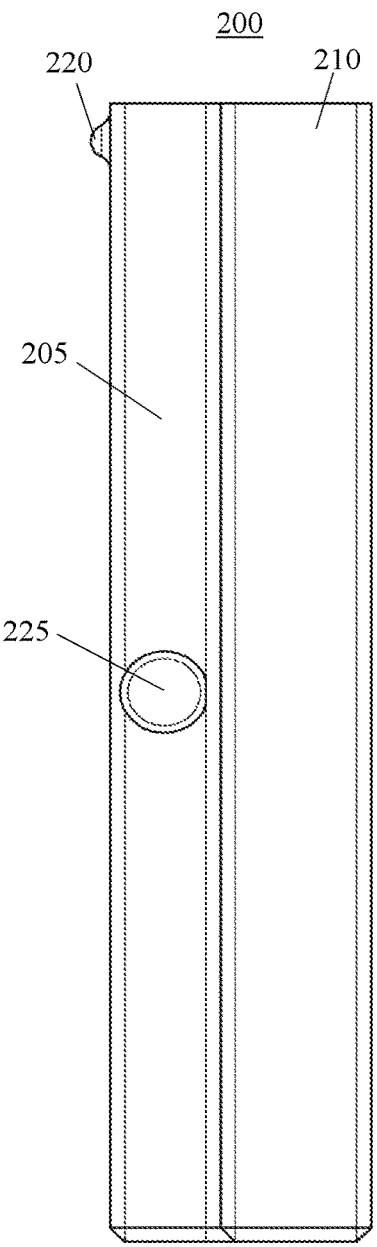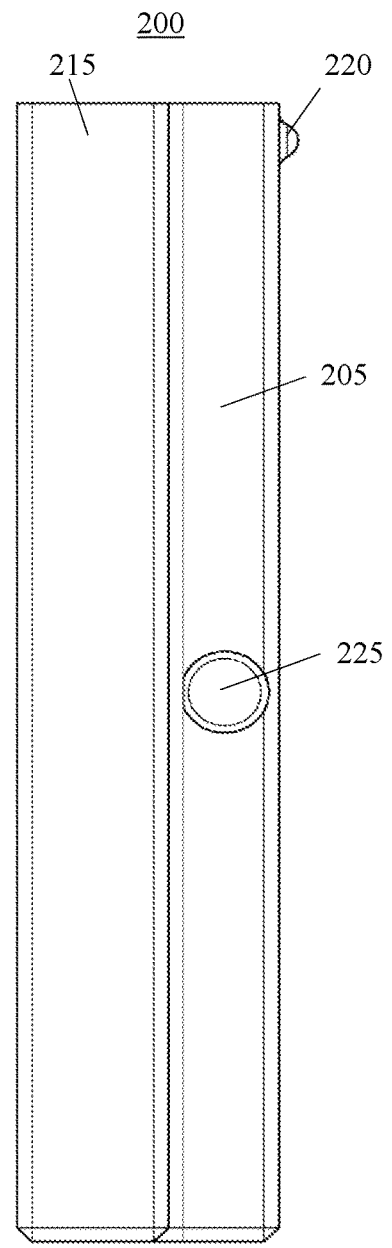
FIG. 2C  FIG. 2D

300

300

300

300

NON-METALLIC VERTEBRAE BEND RESTRICTOR AND VERTEBRAE END PIECE

BACKGROUND OF THE INVENTION

Conventional energy exploration, production, and workover uses one or more rigs, platforms, work vessels, or combinations thereof to perform drilling, completion, workover, or production operations. These operations may require one or more flexible flow lines, flying leads, mux lines, umbilicals, cables, or other flexible conduits. For example, in offshore applications, these flexible conduits may be used to connect certain surface-based equipment disposed on a platform above the waterline to subsea equipment in the water. These flexible conduits form the connective medium and may include one or more of electrical power and signal cabling, hydraulic power and activation cabling, chemical injection cabling, communications cabling, and robotic-operated vehicle cabling. The flexible conduits are exposed to high tensile bending loads during installation and, once disposed in the water, are subjected to internal pressure, hydrostatic loading, high tensile loading and fatigue due to motion of the water or equipment, and loads caused directly or indirectly by unplanned activities. Conventional vertebrae bend restrictors are used to encase and protect one or more flexible conduits in a manner that is similar to the way the vertebrae bones of the human body encase and protect the spinal cord. Conventional vertebrae bend restrictors prevent flexible conduits from bending beyond a rated amount of bend radius under a rated amount of force, thereby protecting the flexible conduit from damage.

BRIEF SUMMARY OF THE INVENTION

According to one aspect of one or more embodiments of the present invention, a non-metallic clip connection system includes a non-metallic clip having a substantially rectangular base portion, a first longitudinal flared wing portion, and a second longitudinal flared wing portion, wherein a plurality of edges of the clip along a path of insertion are beveled or radiused. The non-metallic clip connection system also includes a first non-metallic member having a first portion of a non-metallic clip receiver and a second non-metallic member having a second portion of the non-metallic clip receiver. The first non-metallic member is secured to the second non-metallic member by inserting the non-metallic clip in the non-metallic clip receiver.

According to one aspect of one or more embodiments of the present invention, a non-metallic vertebrae bend restrictor includes a first non-metallic half member, a second non-metallic half member, a first non-metallic clip, and a second non-metallic clip. The first non-metallic half member includes a first half of a ball portion, a first half of a socket portion, a first half of a first non-metallic clip receiver, a first half of a second non-metallic clip receiver, and a first half of a cavity. The second non-metallic half member includes a second half of the ball portion, a second half of the socket portion, a second half of the first non-metallic clip receiver, a second half of the second non-metallic clip receiver, and a second half of the cavity. The first non-metallic half member is secured to the second non-metallic half member by inserting the first non-metallic clip in the first non-metallic clip receiver and inserting the second non-metallic clip in the second non-metallic clip receiver.

According to one aspect of one or more embodiments of the present invention, a non-metallic vertebrae end piece includes a first non-metallic half member, a second non-metallic half member, a first non-metallic clip, and a second non-metallic clip. The first non-metallic half member includes a first half of a socket portion, a first half of a first non-metallic clip receiver, a first half of a second non-metallic clip receiver, and a first half of a cavity. The second non-metallic half member includes a second half of the socket portion, a second half of the first non-metallic clip receiver, a second half of the second non-metallic clip receiver, and a second half of the cavity. The first non-metallic half member is secured to the second non-metallic half member by inserting the first non-metallic clip in the first non-metallic clip receiver and inserting the second non-metallic clip in the second non-metallic clip receiver.

Other aspects of the present invention will be apparent from the following description and claims.

BRIEF DESCRIPTION OF THE DRAWINGS

FIGS. 2A, 2B, 2C, 2D, 2E, 2F, 2G, and 2H show an interior-facing elevation view, an exterior-facing elevation view, a left-side elevation view, a right-side elevation view, a top plan view, a bottom plan view, an interior-facing isometric view, and an exterior-facing isometric view respectively of a non-metallic clip of a non-metallic vertebrae bend restrictor in accordance with one or more embodiments of the present invention.

DETAILED DESCRIPTION OF THE INVENTION

Figure 1A:
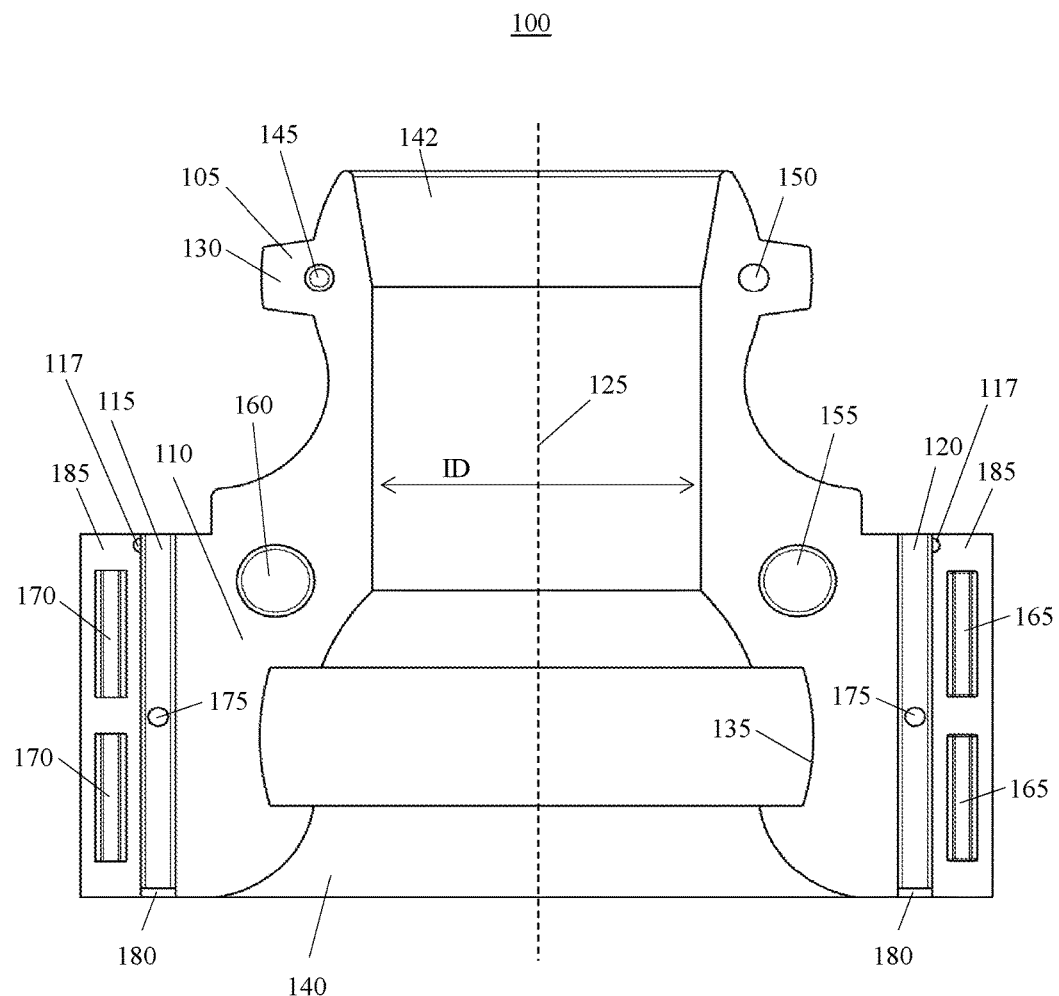
FIGS. 1A, 1B, 1C, 1D, 1E, 1F, 1G, and 1H show an interior-facing elevation view, an exterior-facing elevation view, a left-side elevation view, a right-side elevation view, a top plan view, a bottom plan view, an interior-facing isometric view, and an exterior-facing isometric view respectively of a non-metallic member of a non-metallic vertebrae bend restrictor in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Conventional vertebrae bend restrictors are used in virtually all offshore drilling, production, and workover rigs as well as wind farms and are well known in the art. A conventional vertebrae bend restrictor includes a plurality of vertebrae, each comprised of a first member and a second member that connect around a portion of the conduit and are connected by metallic nuts and bolts typically comprised of steel, snap connections, straps, or zip ties. Conventional vertebrae bend restrictors are assembled in an additive manner such that once a first vertebrae is installed, a socket portion of a second vertebrae encases a ball portion of the first vertebrae and restricts movement between the first and second vertebrae to a rated amount of bend radius under a rated amount of force. This process is repeated until the required number of vertebrae is installed to encase and protect the conduit.

However, the metal content of conventional vertebrae bend restrictors is prone to corrosion unless the metal components are comprised of corrosion resistant alloys, coated in a corrosion resistant coating, or use cathodic protection. While corrosion resistant alloys are effective, they are prohibitively expensive and are typically not used. Coating the metal components in a corrosion resistant coating is also expensive and remains prone to failure over time because of one or more of issues related to the coating composition, the application of the coating composition, or wear and tear. If a failure occurs, a first member and a second member of a vertebrae bend restrictor may detach and the conduit may bend beyond the rated amount of bend radius, resulting in damage or complete loss of the conduit.

Cathodic protection is a technique that attempts to control the erosion of the metal surfaces of the conventional vertebrae bend restrictor by converting the anodic sites of the metal surfaces to cathodic sites by supplying electrical current from an alternate source. Typically, this takes the form of galvanic anodes, which are more active than steel. In this sacrificial system, the galvanic anodes sacrifice themselves to protect the steel nuts and bolts from corrosion. However, cathodic protection is very expensive, requires maintenance, and is prone to failure over time. If a failure occurs, a first member and a second member of a vertebrae bend restrictor may detach and the conduit may bend beyond a rated amount of bend radius, resulting in damage or complete loss of the conduit. While snap connections, straps, and zip ties typically include less metal content, they too suffer from a number of issues that complicate their use. The snap connections, straps, and zip ties do not provide tight connectivity, are unreliable, and are prone to failure over time from wear and tear.

Accordingly, in one or more embodiments of the present invention, a non-metallic vertebrae bend restrictor and a non-metallic vertebrae end piece use a non-metallic clip connection system that does not require coating or cathodic protection and reduces the expense of manufacturing, installing, and maintaining the vertebrae bend restrictor system. Advantageously, the non-metallic vertebrae bend restrictor and non-metallic vertebrae end piece are less expensive to manufacture, easier and less expensive to install, do not require substantive maintenance, and provide improved protection for flexible conduits.

FIG. 1A shows an interior-facing elevation view of a non-metallic member 100 of a non-metallic vertebrae bend restrictor (not shown) in accordance with one or more embodiments of the present invention. Two identical or substantially identical non-metallic members 100 may be joined together around a flexible conduit (not shown) and secured to one another with a non-metallic clip connection system (not shown) to form a non-metallic vertebrae bend restrictor (not shown) in accordance with one or more embodiments of the present invention. One or more non-metallic vertebrae bend restrictors (not shown) may be used as necessary to encase and protect the flexible conduit (not shown). One of ordinary skill in the art will recognize that two substantially identical non-metallic members 100 may vary somewhat from one another in shape, size, and markings based on an application or design in accordance with one or more embodiments of the present invention.

Non-metallic member 100 may include, generally, a ball portion 105 and a socket portion 110 of the non-metallic vertebrae bend restrictor (not shown). Ball portion 105 may include a protruding rib portion 130 that is configured to fit and move within a rib receiver portion 135 of another non-metallic vertebrae bend restrictor (not shown). A boss portion 185 may include a first portion of a first non-metallic clip receiver 115 on the left side of member 100 and a first portion of a second non-metallic clip receiver 120 on the right side of member 100 such that, when two non-metallic members 100 are joined together, form a first non-metallic clip receiver (not shown) and a second non-metallic clip receiver (not shown) that are configured to receive non-metallic clips (not shown). Boss portion 185 may include an optional boss clip stop portion 180 to prevent over insertion of the non-metallic clips (not shown) and one or more optional boss retention screw receivers 175 that may be used to provide additional retention force to the clips (not shown). Each of first portion of first non-metallic clip receiver 115 and first portion of second non-metallic clip receiver 120 may include a portion of a clip retention feature receiver 117 such that, when two non-metallic members 100 are joined together, form a first clip retention feature receiver (not shown) and a second clip retention feature receiver (not shown) that are configured to receive a clip retention feature (not shown) of the non-metallic clips (not shown) to prevent ejection of the non-metallic clips (not shown).

Non-metallic member 100 may include a portion of a cavity (of which 125 denotes a centerline therethrough) that extends from the top through to the bottom of member 100. Cavity 125 may have an inner diameter, ID, suitable to encase a flexible conduit (not shown). In certain embodiments, the ID may be slightly larger than the conduit. In other embodiments, the ID may be substantially larger than the conduit. One of ordinary skill in the art will recognize that the ID may vary based on an application or design in accordance with one or more embodiments of the present invention. Portion of cavity 125 may include a flared portion 140 that extends from socket portion 110 to the bottom of member 100 and a flared portion 142 that extends from ball portion 105 to the top of member 100.

Non-metallic member 100 may include one or more optional ball alignment and shear protrusions 145 and one or more optional receivers 150 that may be used to align ball portions 105 of two non-metallic members 100 during assembly of a non-metallic vertebrae bend restrictor (not shown) and take shear loads once assembled. In certain embodiments, ball alignment and shear protrusion 145 may have a substantially cylindrical shape and a diameter that may vary based on an application or design and ball alignment and shear protrusion receiver 150 may vary accordingly. One of ordinary skill in the art will recognize that the size, shape, number, and location of ball alignment and shear protrusion 145 and receiver 150 may vary in accordance with one or more embodiments of the present invention.

Non-metallic member 100 may include an optional socket alignment and shear protrusion 155 and an optional socket alignment and shear protrusion receiver 160 that may be used to align socket portions 110 of two non-metallic members 100 during assembly of a non-metallic vertebrae bend restrictor (not shown) and take shear loads once assembled. In certain embodiments, socket alignment and shear protrusion 155 may have a substantially cylindrical shape and have a diameter that may vary based on an application or design and socket alignment and shear protrusion receiver 160 may vary accordingly. One of ordinary skill in the art will recognize that the size, shape, number, and location of socket alignment and shear protrusion 155 and receiver 160 may vary in accordance with one or more embodiments of the present invention. Ball alignment and shear protrusion 145 and socket alignment and shear protrusion 155 may preferably be disposed on opposing sides of non-metallic half member 100 as shown in the figure or may be disposed on the same side in other embodiments.

Non-metallic member 100 may include one or more optional boss alignment and shear protrusions 165 and one or more optional boss alignment and shear protrusion receivers 170 that may be used to align the boss portions 185 of two non-metallic members 100 during assembly of a non-metallic vertebrae bend restrictor (not shown) and take shear loads once assembled. In certain embodiments, boss alignment and shear protrusion 165 may have a substantially trapezoidal shape and have a length and width that may vary based on an application or design and boss alignment and shear protrusion receiver 170 may vary accordingly. One of ordinary skill in the art will recognize that the size, shape, number, and location of boss alignment and shear protrusion 165 and receiver 170 may vary in accordance with one or more embodiments of the present invention. Boss alignment and shear protrusion 165 may be disposed on either side of non-metallic half member 100.

Figure 1B:
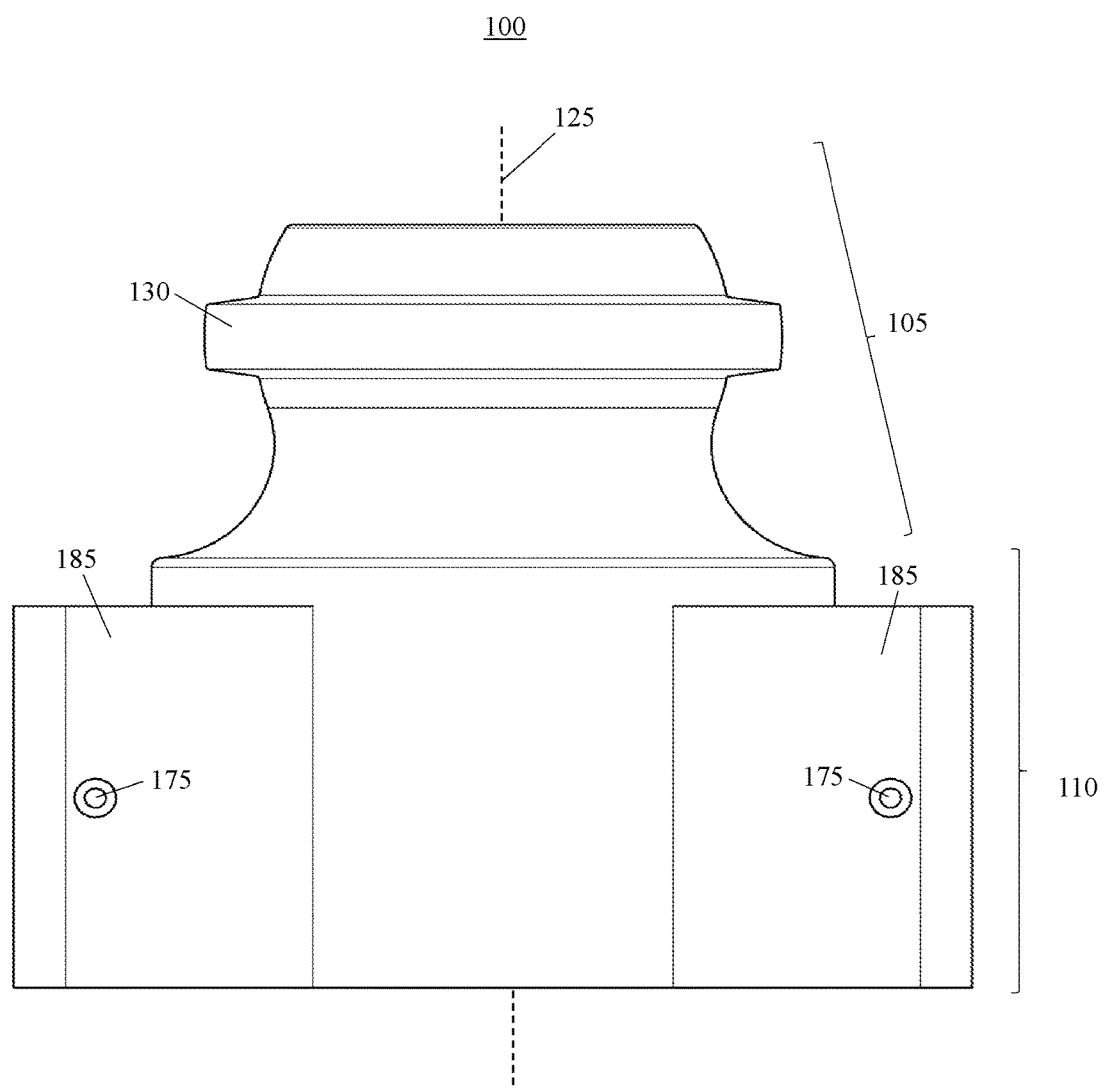
Figures 1C, 1D:
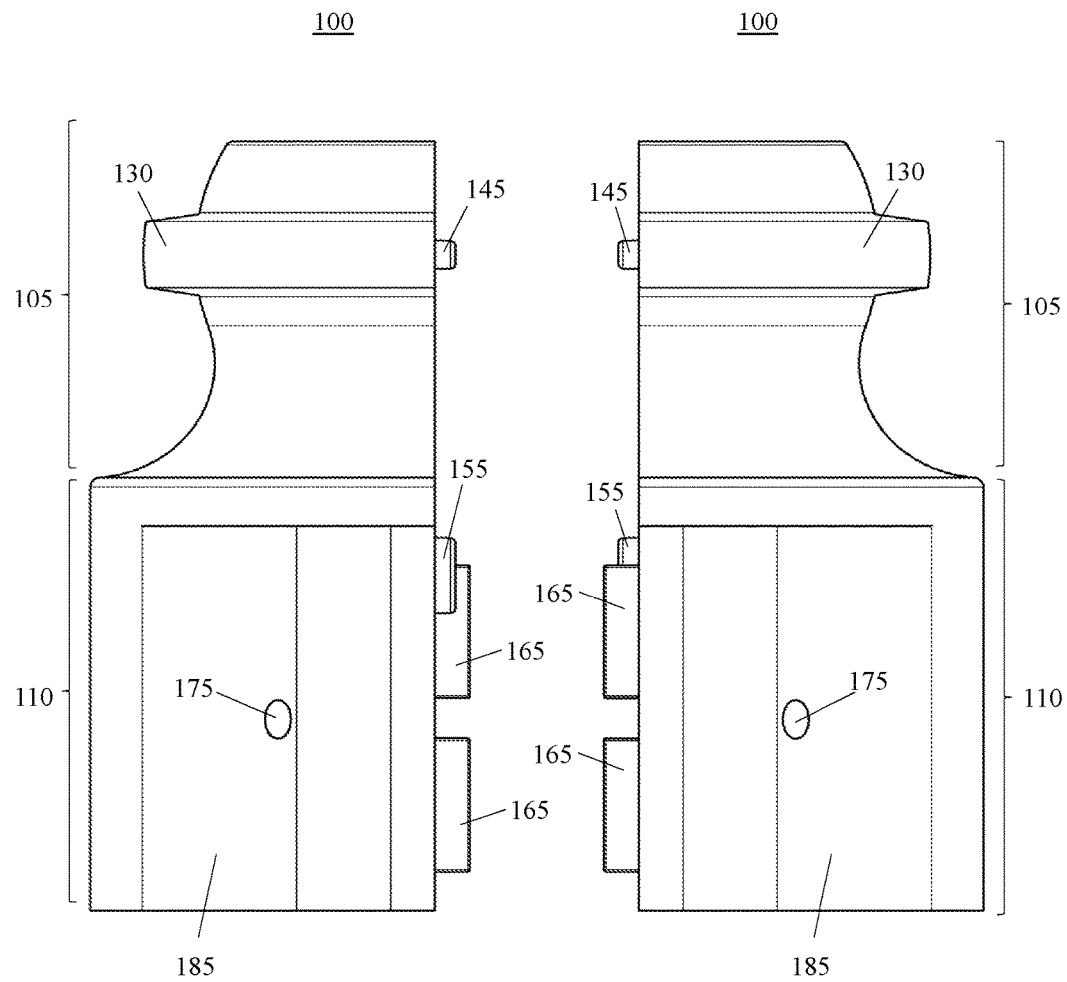

Continuing, FIG. 1B shows an exterior-facing elevation view of a non-metallic member 100 of a non-metallic vertebrae bend restrictor (not shown) in accordance with one or more embodiments of the present invention. In the view, an exterior view of optional boss retention screw receivers 175 is shown, where, after joining of two non-metallic members (not shown) with two non-metallic clips (not shown), optional retention screws (not shown) may be inserted from the exterior side of non-metallic member 100 and come to rest in optional clip retention screw receivers (not shown) of the clips (not shown) to provide additional retention force to the clips (not shown). Also in this view, a rib portion 130 and a boss portion 185 are shown. Continuing, FIG. 1C shows a left-side elevation view and FIG. 1D shows a right-side elevation view of a non-metallic member 100 of a non-metallic vertebrae bend restrictor (not shown) in accordance with one or more embodiments of the present invention. In these views, ball alignment and shear protrusions 145, socket alignment and shear protrusions 155, and boss alignment and shear protrusions 165 are shown. FIG. 1C and FIG. 1D are also representative of how two non-metallic members 100 would be oriented to face and align with one another prior to being joined together around a flexible conduit.

Figure 1E:
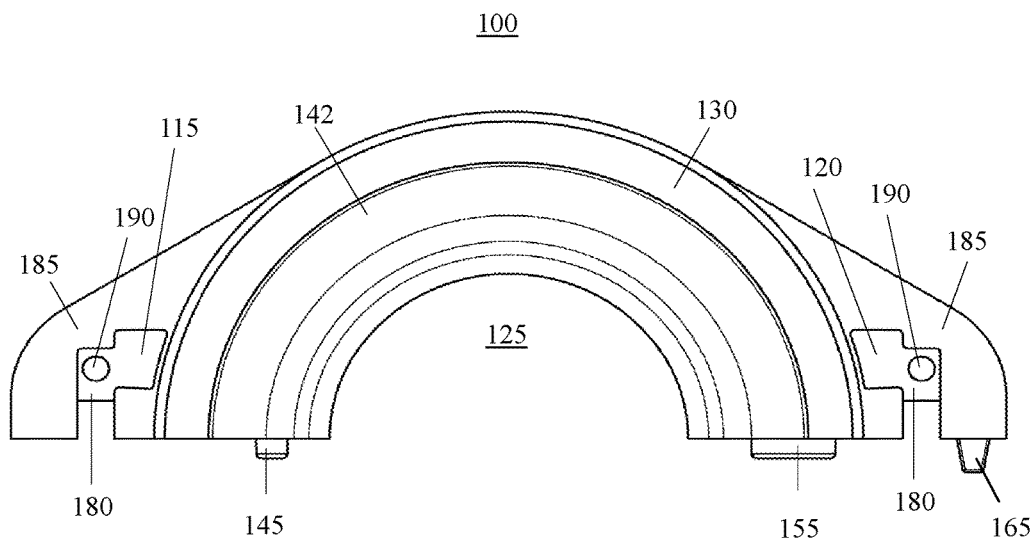
Figure 1F:
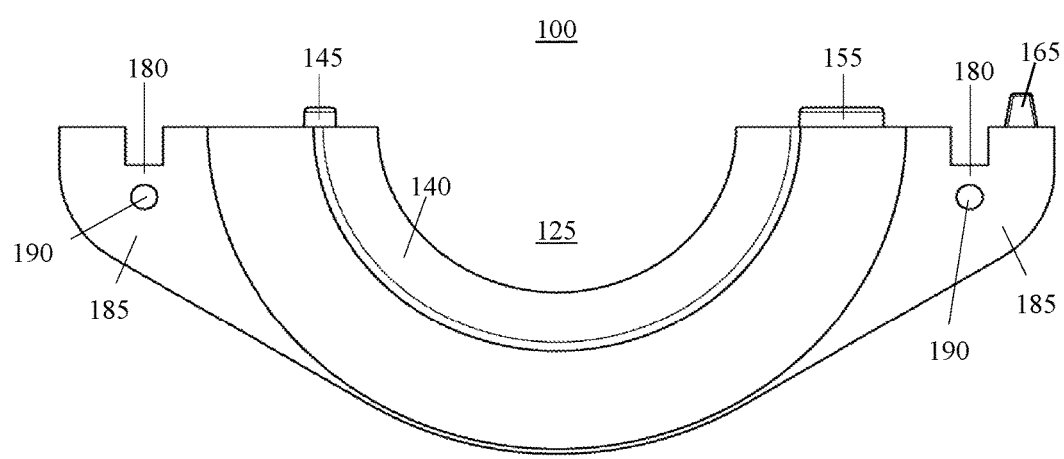

Continuing, FIG. 1E shows a top plan view of a non-metallic member 100 of a non-metallic vertebrae bend restrictor (not shown) in accordance with one or more embodiments of the present invention. In this view, the shape of a first portion of first non-metallic clip receiver 115 and the shape of a first portion of second non-metallic clip receiver 120 is shown as well as optional boss clip stop portion 180 that prevents over insertion of the clips (not shown). In addition, a portion of cavity 125, which encases the flexible conduit (not shown) is shown. Continuing, FIG. 1F shows a bottom plan view a non-metallic member 100 of a non-metallic vertebrae bend restrictor (not shown) in accordance with one or more embodiments of the present invention. In this view, flared portion 140 is shown that extends from socket portion 110 to the bottom of member 100 that allows for clearance.

Figure 1G:
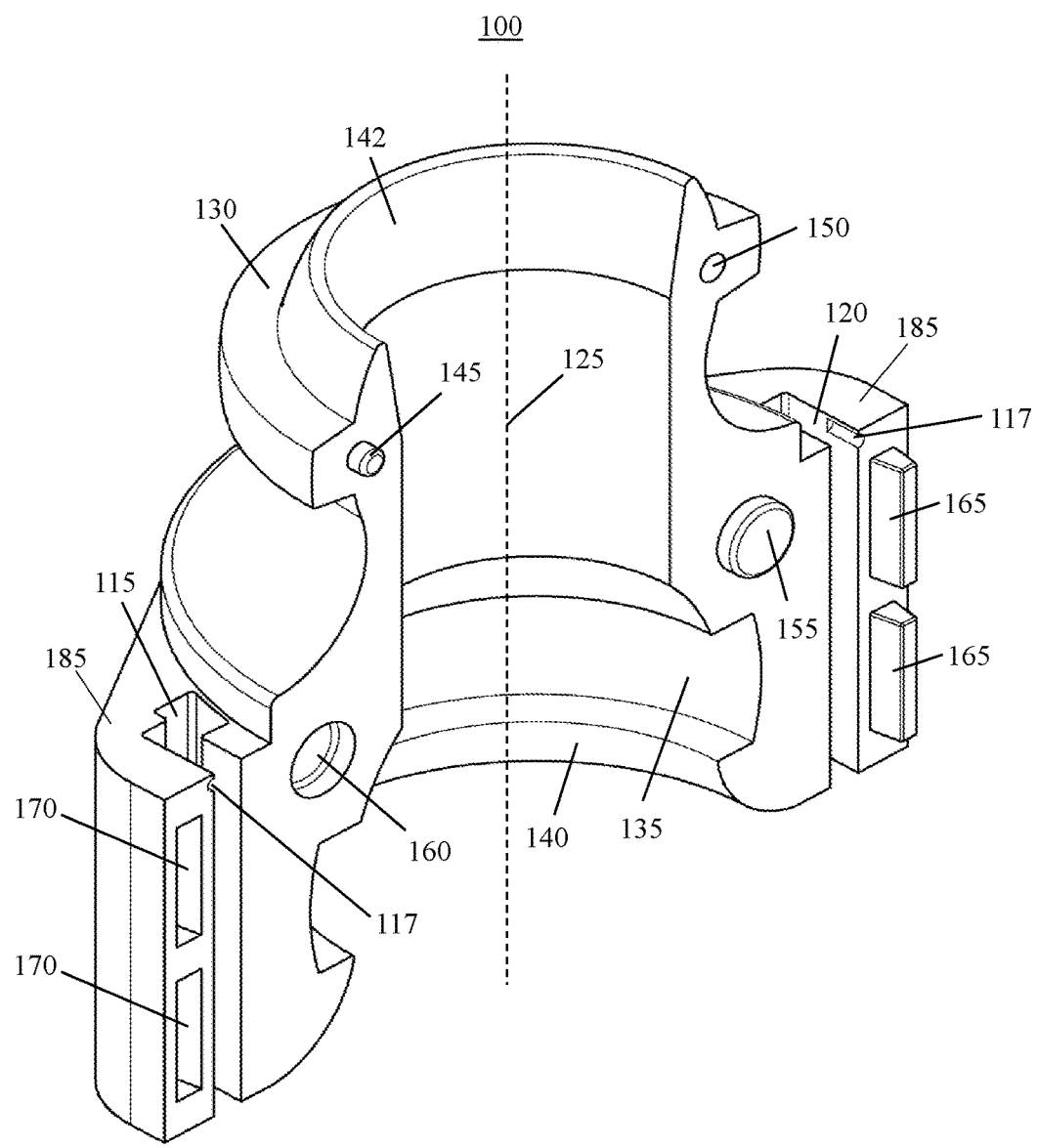
Figure 1H:
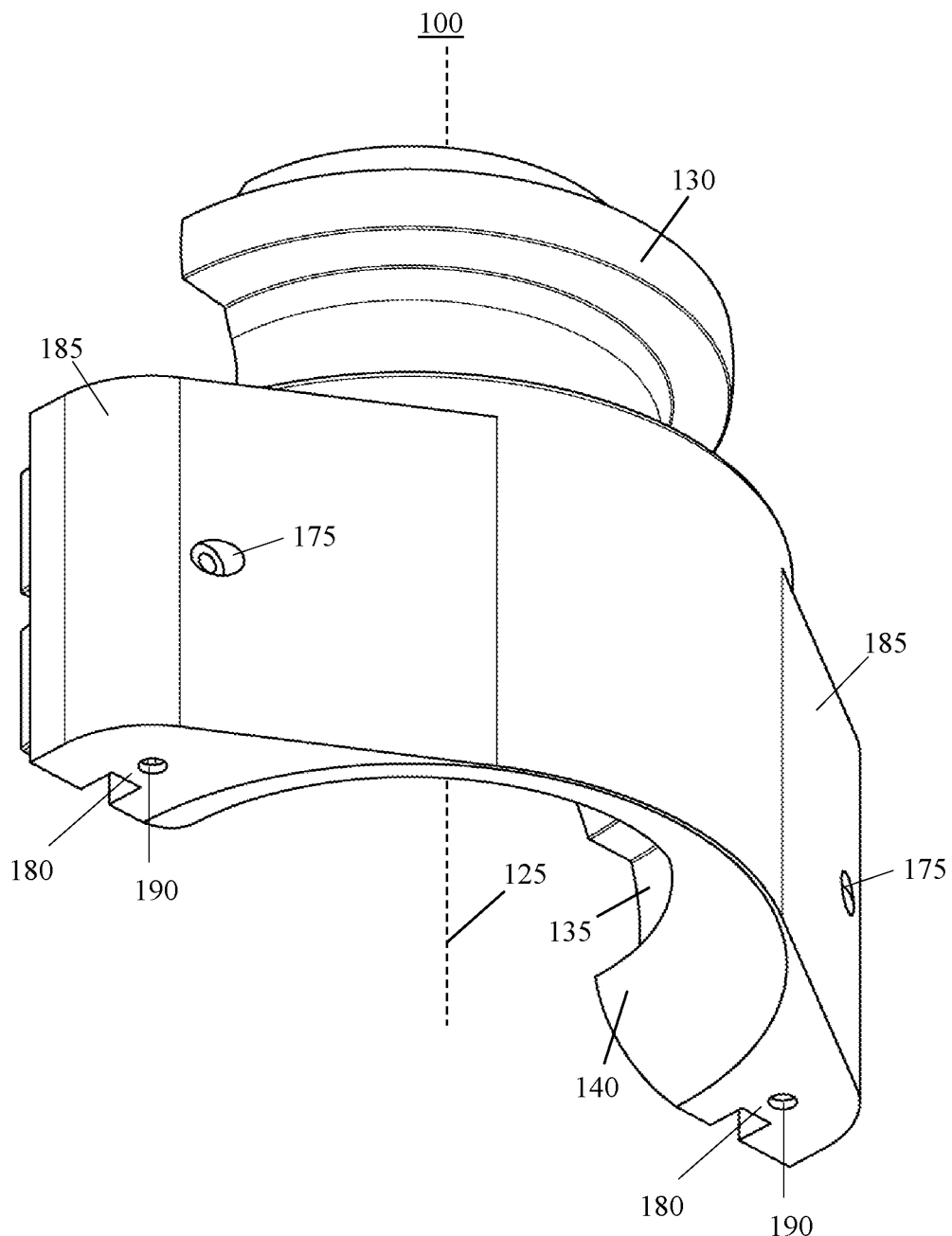

Continuing, FIG. 1G shows an interior-facing isometric view of a non-metallic member 100 of a non-metallic vertebrae bend restrictor (not shown) in accordance with one or more embodiments of the present invention. In this view, a portion of clip retention feature receiver 117 is shown. When two non-metallic members 100 are joined together, two portions 117 form a clip retention feature receiver (not shown) that is configured to receive a clip retention feature (not shown) of a clip (not shown) to promote retention of the clip (not shown). Continuing, FIG. 1H shows an exterior-facing isometric view of a non-metallic member 100 of a non-metallic vertebrae bend restrictor (not shown) in accordance with one or more embodiments of the present invention.

In certain embodiments, non-metallic member 100 may be composed of a polyurethane polymer. In other embodiments, non-metallic member 100 may be composed of acetyl, high density polypropylene, thermoset plastic, carbon reinforced plastic, thermoset urethane, or fiberglass reinforced urethane. In still other embodiments, non-metallic member 100 may be composed of other non-metallic high modulus materials. One of ordinary skill in the art will recognize that any non-metallic high modulus material suitable for encasing and protecting a flexible conduit (not shown) may be used in accordance with one or more embodiments of the present invention.

Figure 2A:
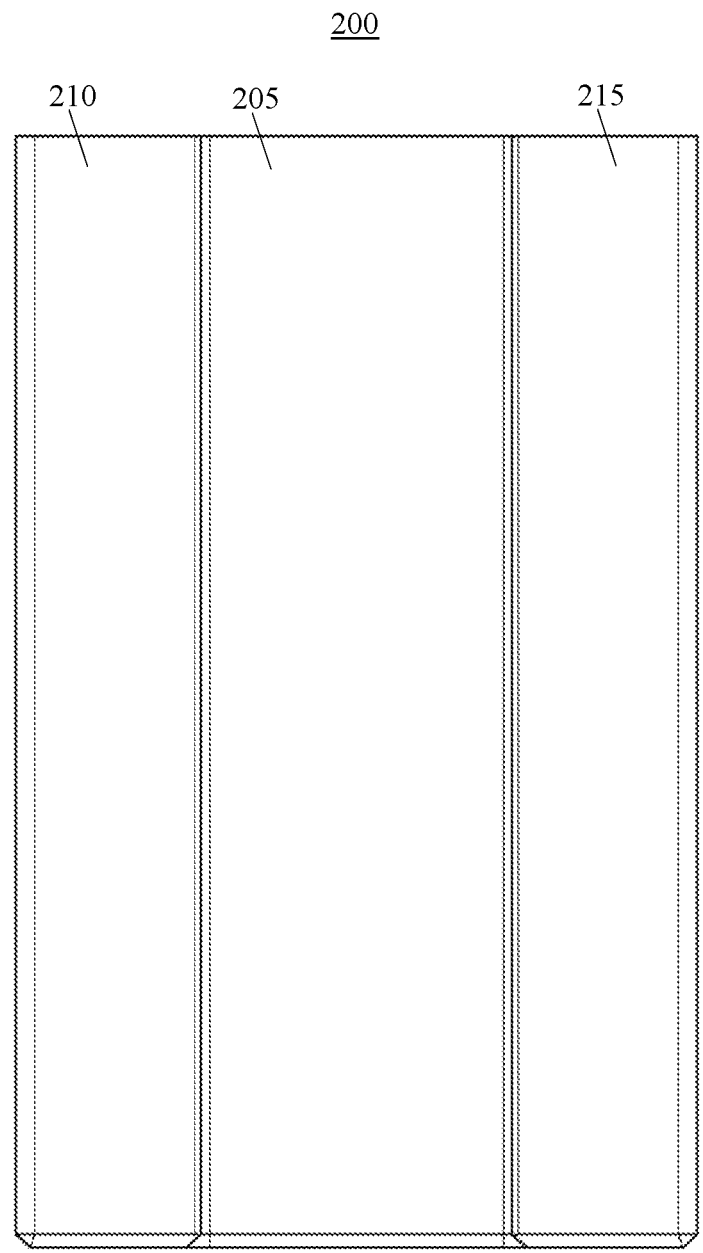
Figure 2B:
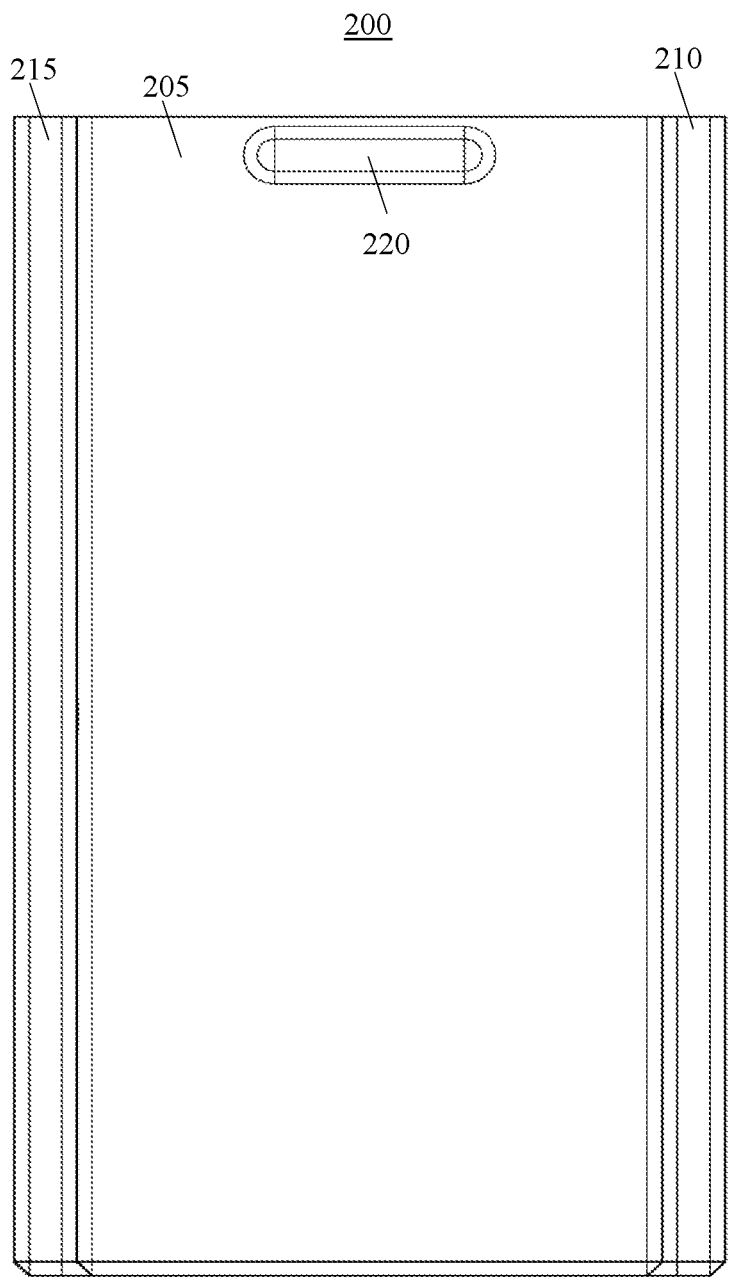

FIG. 2A shows an interior-facing elevation view of a non-metallic clip 200 of a non-metallic vertebrae bend restrictor (not shown) in accordance with one or more embodiments of the present invention. Non-metallic clip 200 may include a substantially rectangular base portion 205, a first longitudinal flared wing portion 210, and a second longitudinal flared wing portion 215. Continuing, FIG. 2B shows an exterior-facing elevation view of a non-metallic clip 200 of a non-metallic vertebrae bend restrictor (not shown) in accordance with one or more embodiments of the present invention. In this view, clip retention feature 220 is shown that may be used to promote retention of clip 200 after assembly. Continuing, FIG. 2C shows a left-side elevation view of a non-metallic clip 200 of a non-metallic vertebrae bend restrictor (not shown) in accordance with one or more embodiments of the present invention. In this view, an optional clip retention screw receiver 225 is shown. During assembly of a non-metallic vertebrae bend restrictor (400 of FIG. 4), once two non-metallic members (100 of FIG. 1) are joined together, one or more clips 200 may be inserted into one or more non-metallic clip receivers (410 of FIG. 4). One or more optional retention screws (300 of FIG. 3) may be passed through optional boss retention screw receivers (175 of FIG. 1) of a non-metallic member (100 of FIG. 1) and into one or more optional clip retention screw receivers 225 of each clip 200 to further secure clip 200 into place. Continuing, FIG. 2D shows a right-side elevation view of a non-metallic clip 200 of a non-metallic vertebrae bend restrictor (not shown) in accordance with one or more embodiments of the present invention. In this view, another optional clip retention screw receiver 225 disposed on the opposing side of clip 200 is shown.

Figure 2E:
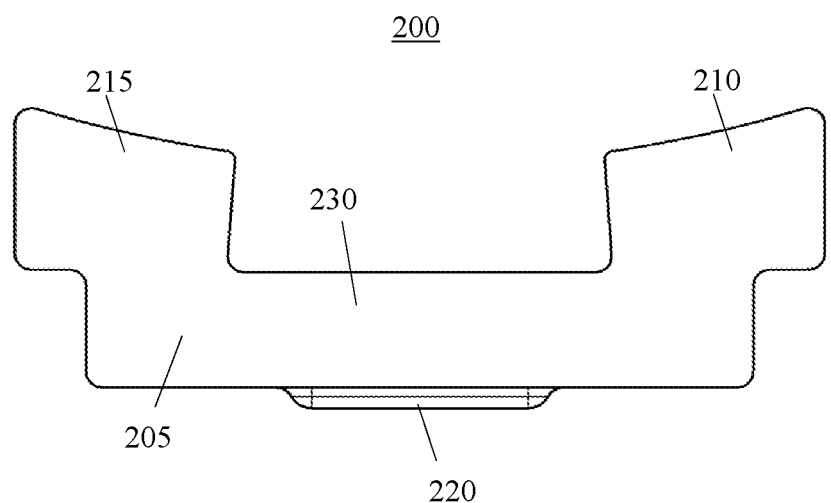
Figure 2F:
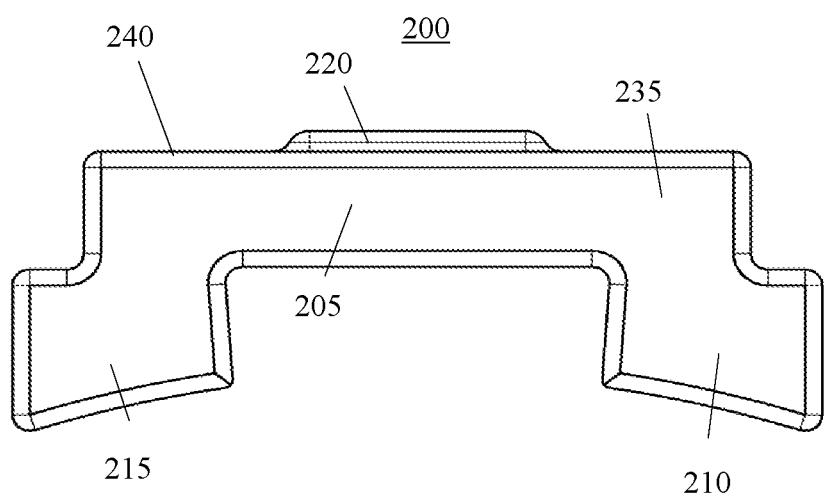
Figure 2G:
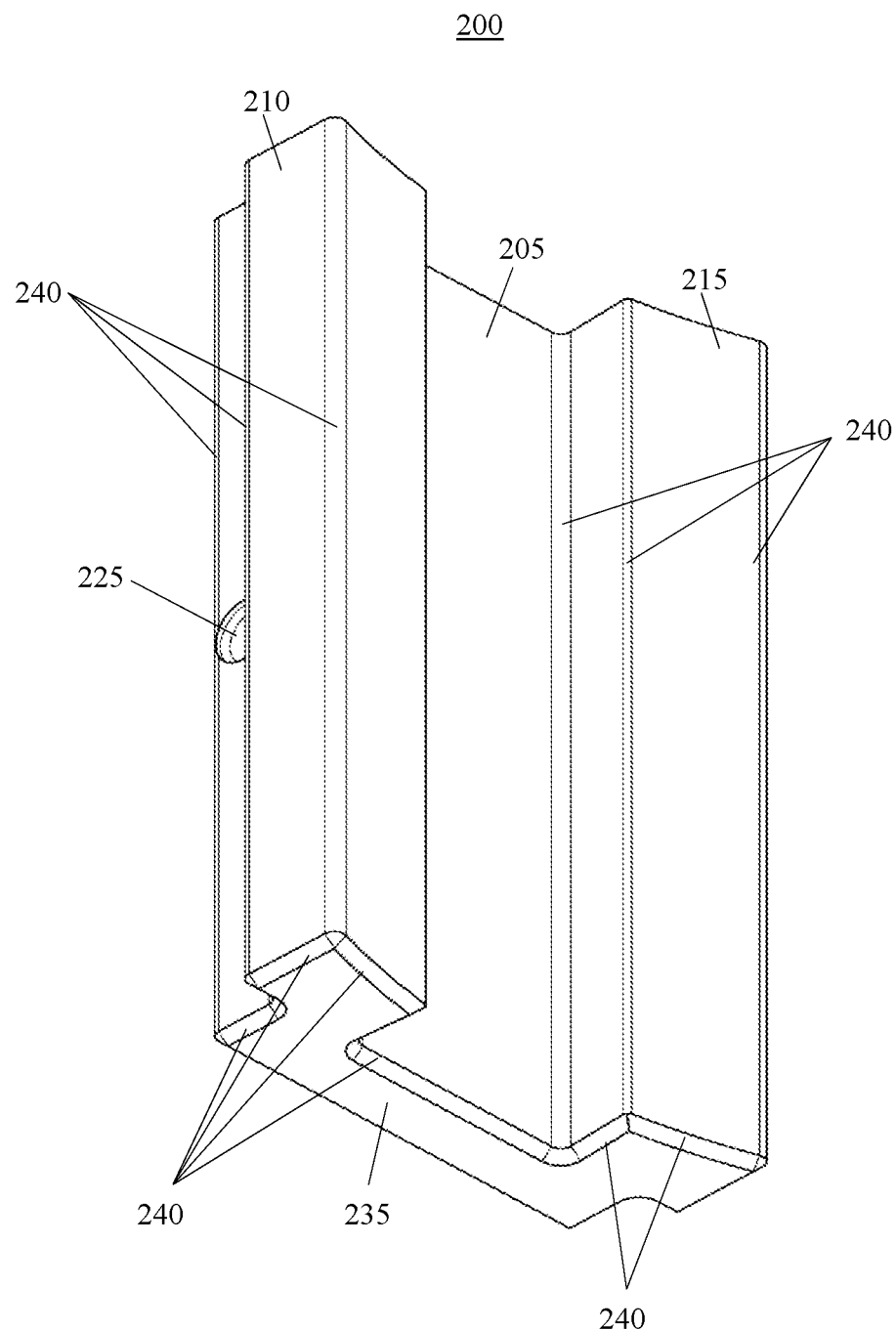
Figure 2H:
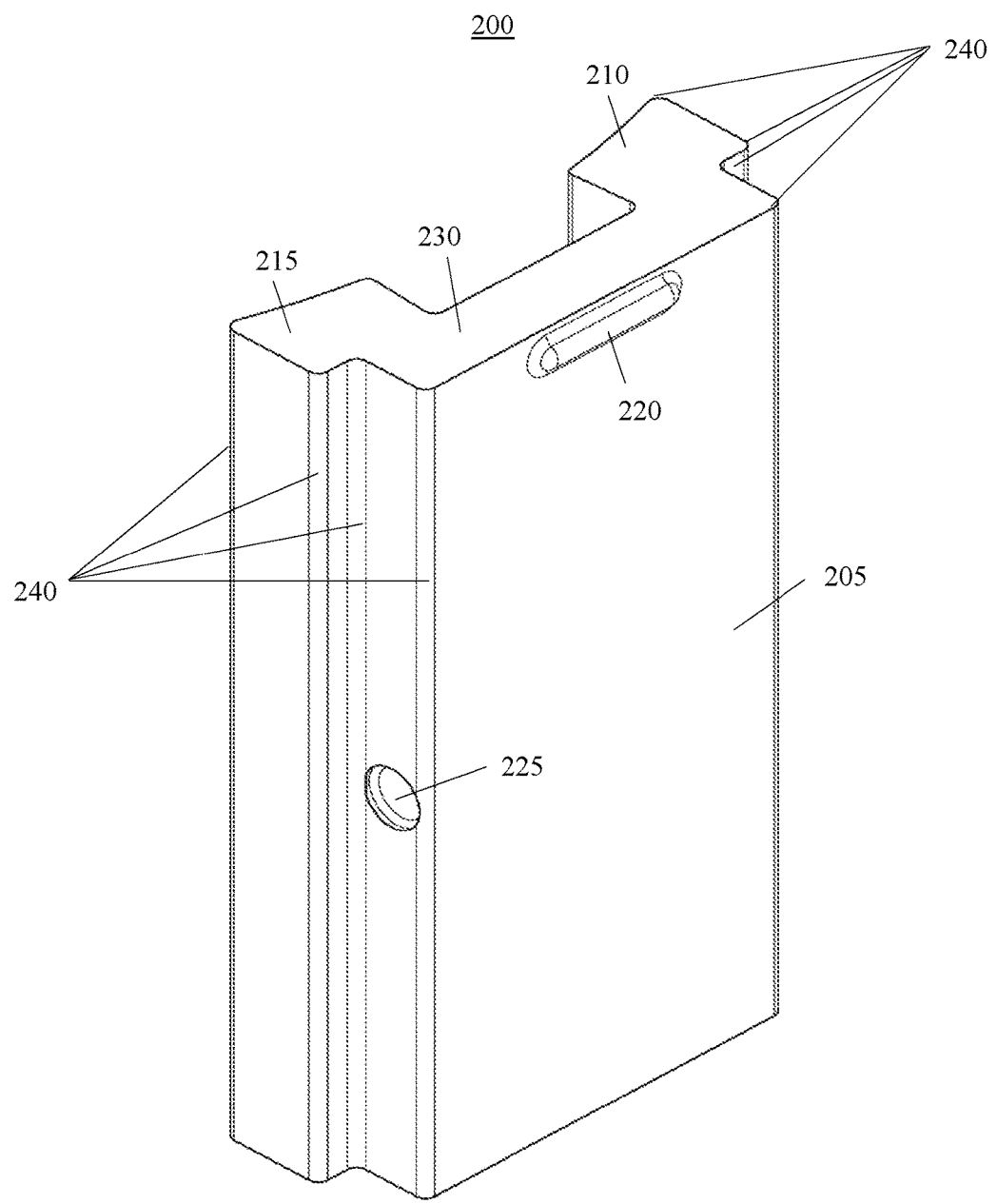

Continuing, FIG. 2E shows a top plan view of a non-metallic clip 200 of a non-metallic vertebrae bend restrictor (not shown) in accordance with one or more embodiments of the present invention. In this view, top portions of the substantially rectangular base portion 205, clip retention feature 220, first longitudinal flared wing portion 210, and second longitudinal flared wing portion 215 are shown. First and second longitudinal flared wing portions 210, 215 may have substantially flat exterior facing surfaces and flared interior facing surfaces. Continuing, FIG. 2F shows a bottom plan view of a non-metallic clip 200 of a non-metallic vertebrae bend restrictor (not shown) in accordance with one or more embodiments of the present invention. One or more bottom facing edges may be beveled 240 or radiused (not shown) to assist with insertion of clip 200 into a clip receiver (not shown). Continuing, FIG. 2G shows an interior-facing isometric view of a non-metallic clip 200 of a non-metallic vertebrae bend restrictor (not shown) in accordance with one or more embodiments of the present invention. In this view, interior longitudinal edges and bottom facing edges are beveled 240 or radiused (not shown) to assist with insertion of clip 200 into a clip receiver (not shown). In addition, an optional clip stop retention screw receiver 225 is shown. Continuing, FIG. 2H shows an exterior-facing isometric view of a non-metallic clip 200 of a non-metallic vertebrae bend restrictor (not shown) in accordance with one or more embodiments of the present invention. In this view, exterior longitudinal edges are beveled 240 or radiused (not shown) to assist with insertion of clip 200 into a clip receiver (not shown). In addition, another optional clip stop retention screw receiver 225 is shown.

In one or more embodiments of the present invention, two non-metallic clips 200 may be used as part of a non-metallic vertebrae bend restrictor (not shown). One of ordinary skill in the art will recognize that the size, shape, and number of clips 200 used may vary based on an application or design in accordance with one or more embodiments of the present invention. In certain embodiments, non-metallic clip 200 may be composed of a polyurethane polymer. In other embodiments, non-metallic clip 200 may be composed of acetyl, high density polypropylene, thermoset plastic, carbon reinforced plastic, thermoset urethane, or fiberglass reinforced urethane. In still other embodiments, non-metallic clip 200 may be composed of other non-metallic high modulus material. While it is preferable that non-metallic clip 200 be composed of the same material as the non-metallic members (100 of FIG. 1) that is joins together, one of ordinary skill in the art will recognize that any suitable non-metallic high modulus material may be used in accordance with one or more embodiments of the present invention.

Figure 3A:
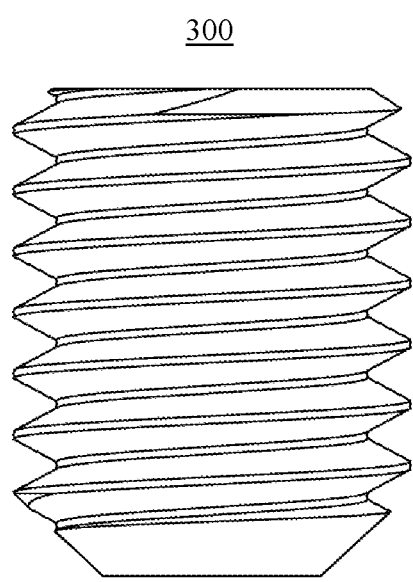
FIGS. 3A, 3B, 3C, and 3D show an elevation view, an isometric view, a top plan view, and a bottom plan view respectively of an optional retention screw for a non-metallic clip of a non-metallic vertebrae bend restrictor in accordance with one or more embodiments of the present invention.
Figure 3B:
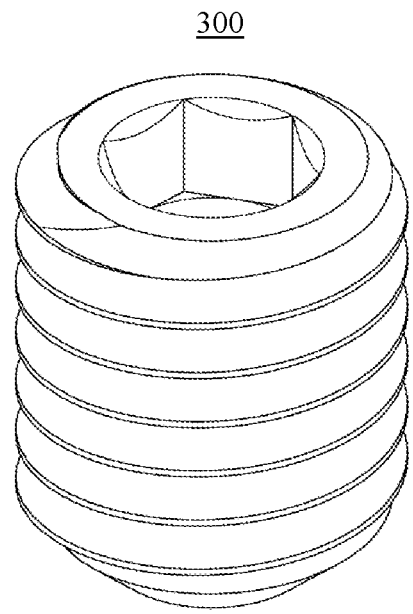
Figure 3C:
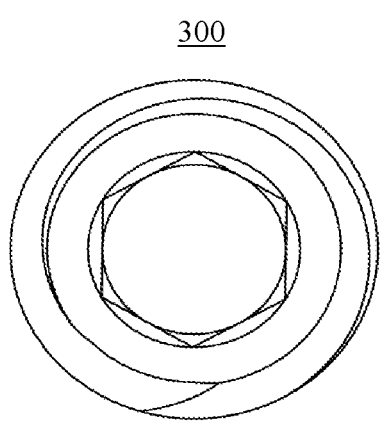
Figure 3D:
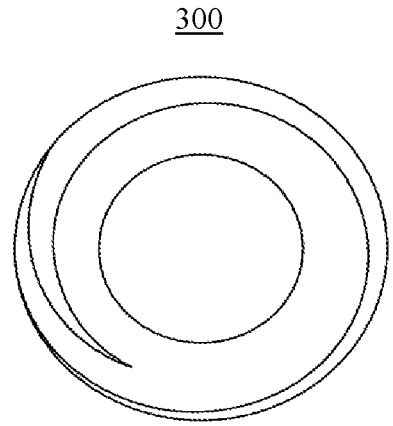

FIG. 3A shows an elevation view of an optional retention screw 300 for a non-metallic clip of a non-metallic vertebrae bend restrictor in accordance with one or more embodiments of the present invention. In one or more embodiments of the present invention, one or more optional retention screws 300 may be used to further secure clips (200 of FIG. 2) into place after assembly of a non-metallic vertebrae bend restrictor (400 of FIG. 4). Continuing, FIG. 3B shows a top facing isometric view of an optional retention screw 300 in accordance with one or more embodiments of the present invention. Continuing, FIG. 3C shows a top plan view of an optional retention screw 300 in accordance with one or more embodiments of the present invention. Continuing, FIG. 3D shows a bottom plan view of an optional retention screw 300 in accordance with one or more embodiments of the present invention. In certain embodiments, optional retention screw 300 may be composed of nylon. In other embodiments, optional retention screw 300 may be composed of other non-metallic material. One of ordinary skill in the art will recognize that any suitable non-metallic material may be used in accordance with one or more embodiments of the present invention.

Figure 4A:
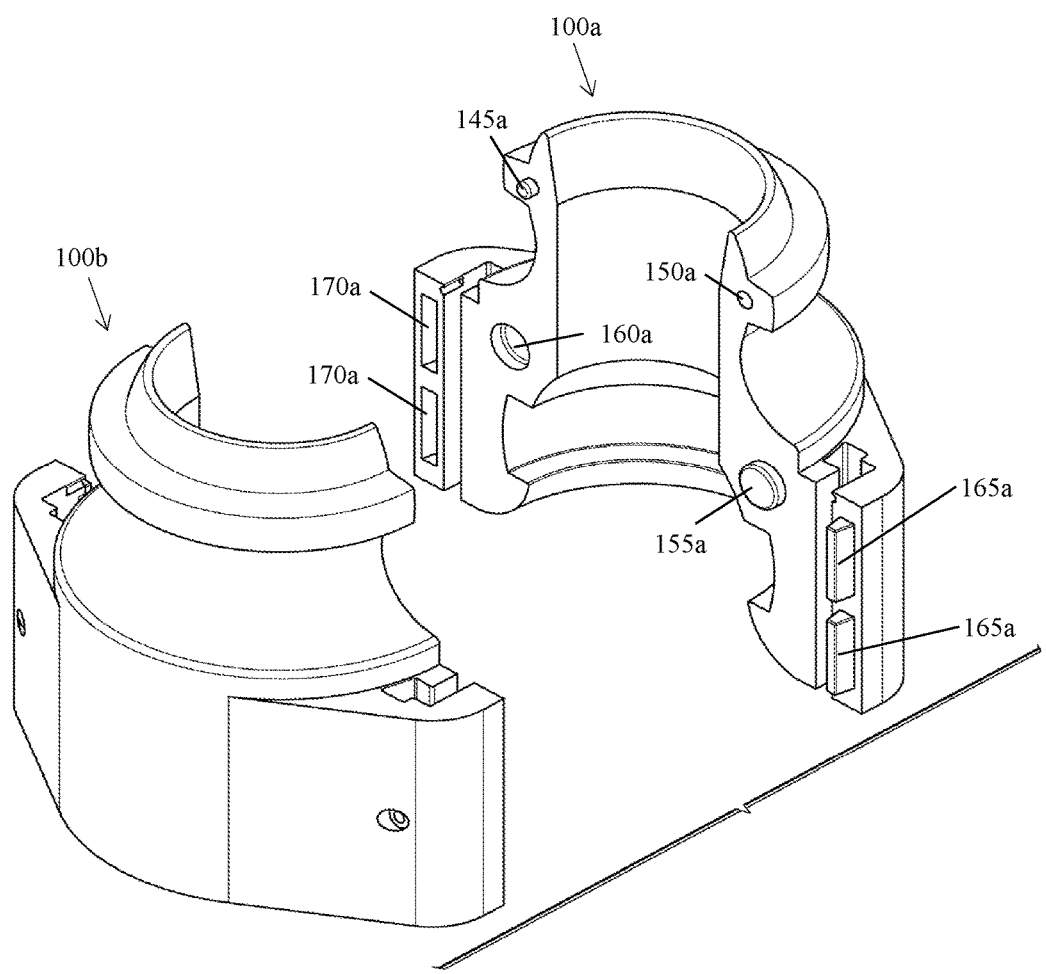
FIGS. 4A, 4B, 4C, 4D, 4E, 4F, 4G, 4H, and 4I show two non-metallic members of a non-metallic vertebrae bend restrictor coming together, insertion of a first non-metallic clip and optional retention screws, insertion of a second non-metallic clip and optional retention screws, a front or rear facing elevation view assembled, a left-side or right-side elevation view assembled, a top plan view assembled, a bottom plan view assembled, a top-facing isometric view assembled, and a bottom facing isometric view assembled respectively of a non-metallic vertebrae bend restrictor in accordance with one or more embodiments of the present invention.

FIG. 4A shows two non-metallic members 100a, 100b of a non-metallic vertebrae bend restrictor (partially shown) coming together during assembly in accordance with one or more embodiments of the present invention. An interior face of a first non-metallic member 100a may face and align with an interior face of a second non-metallic member 100b around a flexible conduit (not shown). Optional ball alignment and shear protrusion 145a of first non-metallic member 100a may align and insert into an optional ball alignment and shear protrusion receiver (not shown) of second non-metallic member 100b. Similarly, an optional ball alignment and shear protrusion (not shown) of second non-metallic member 100b may align and insert into optional ball alignment and shear protrusion receiver 150a of first non-metallic member 100a. Optional socket alignment and shear protrusion 155a of first non-metallic member 100a may align and insert into an optional socket alignment and shear protrusion receiver (not shown) of second non-metallic member 100b. Similarly, an optional socket alignment and shear protrusion (not shown) of second non-metallic member 100b may align and insert into optional socket alignment and shear protrusion receiver 160a of first non-metallic member 100a. One or more optional boss alignment and shear protrusions 165a of first non-metallic member 100a may align and insert into one or more optional boss alignment and shear protrusion receivers (not shown) of second non-metallic member 100b. Similarly, one or more optional boss alignment and shear protrusions (not shown) of second non-metallic member 100b may align and insert into one or more optional boss alignment and shear protrusion receivers 170a of first non-metallic member 100a.

Figure 4B:
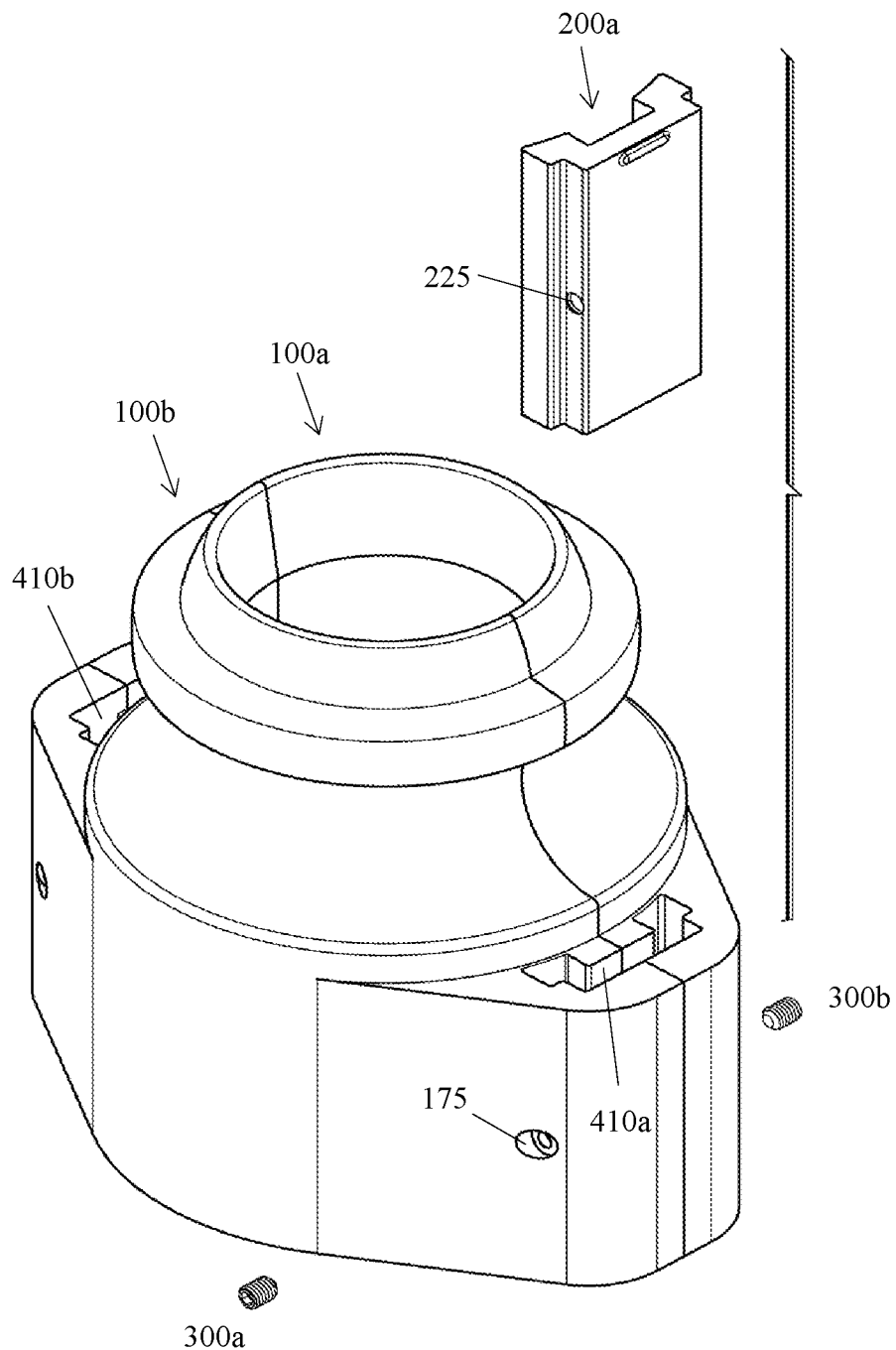
Figure 4C:
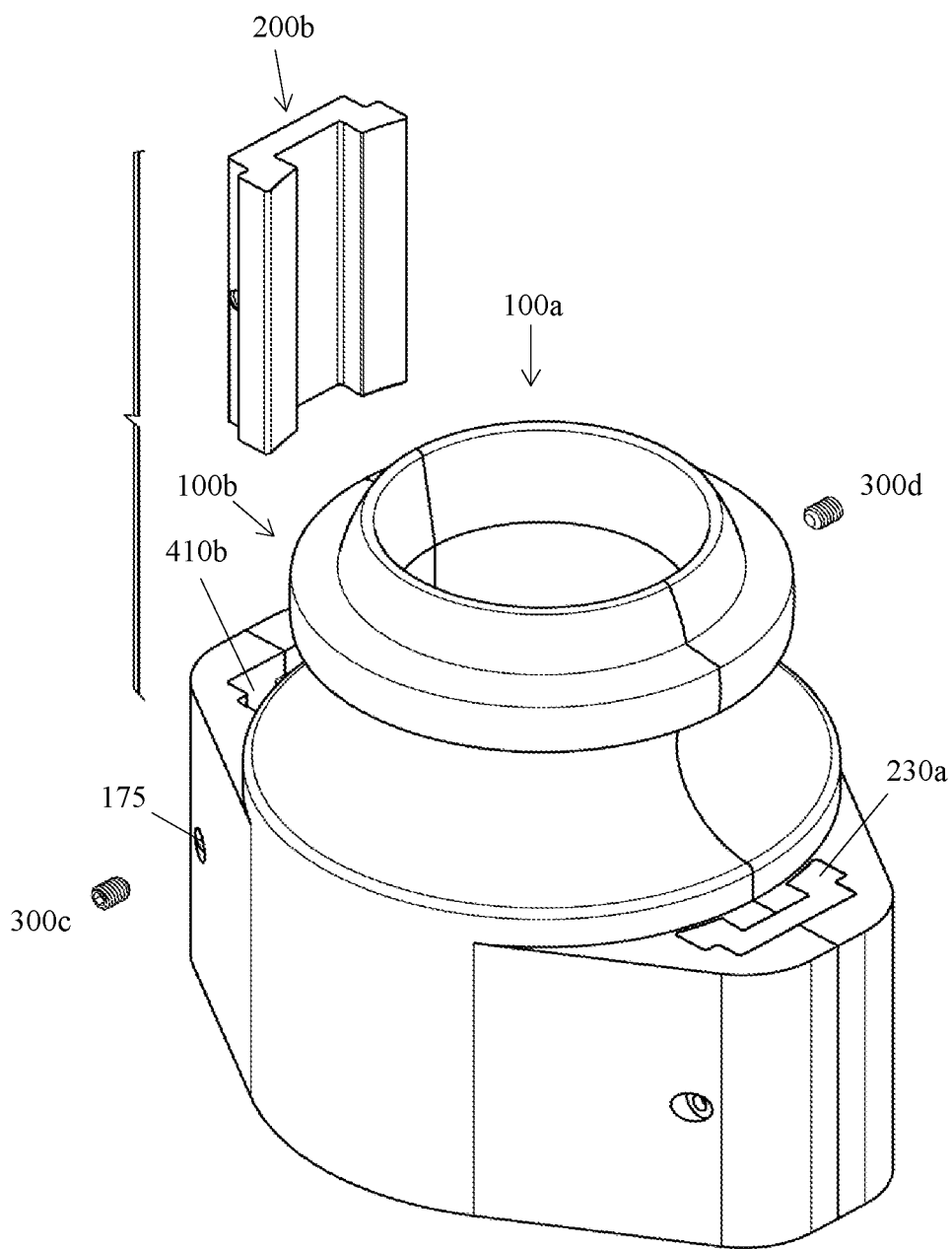
Figure 4D:
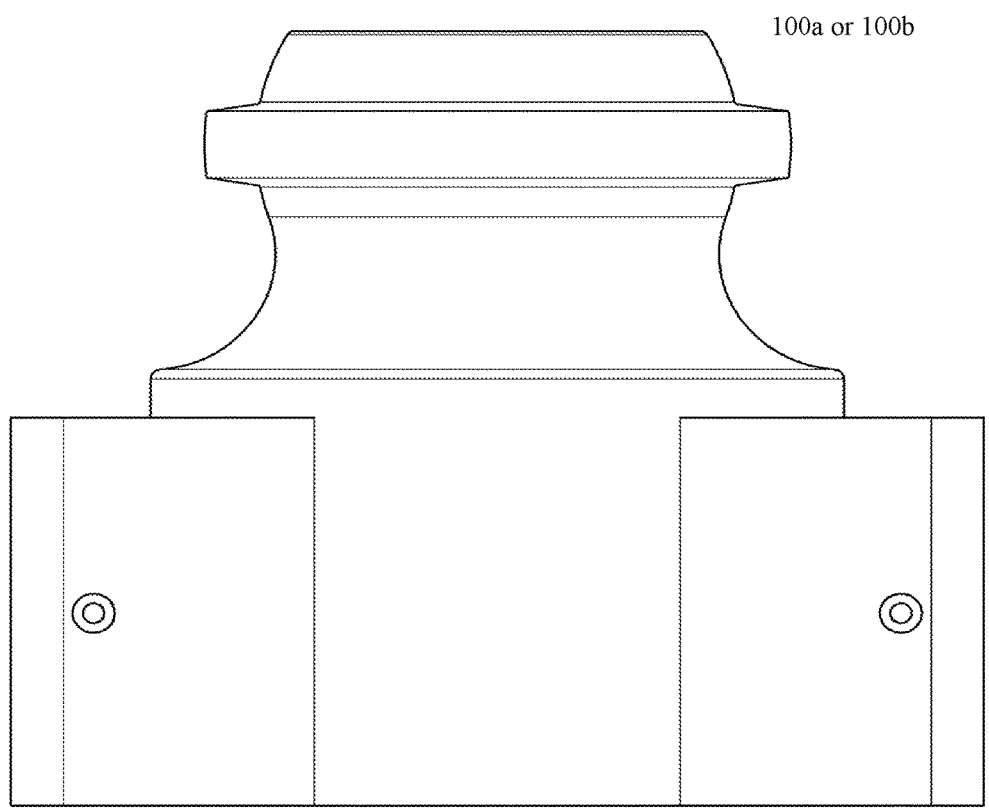
Figure 4E:
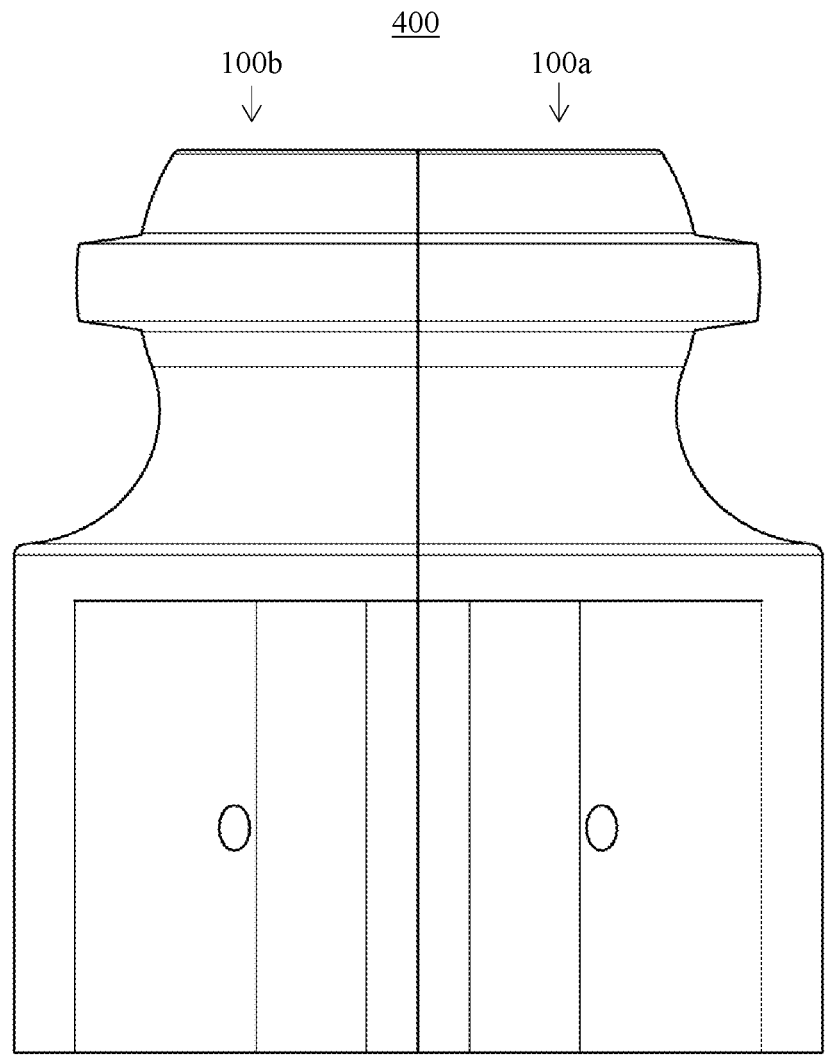
Figure 4F:
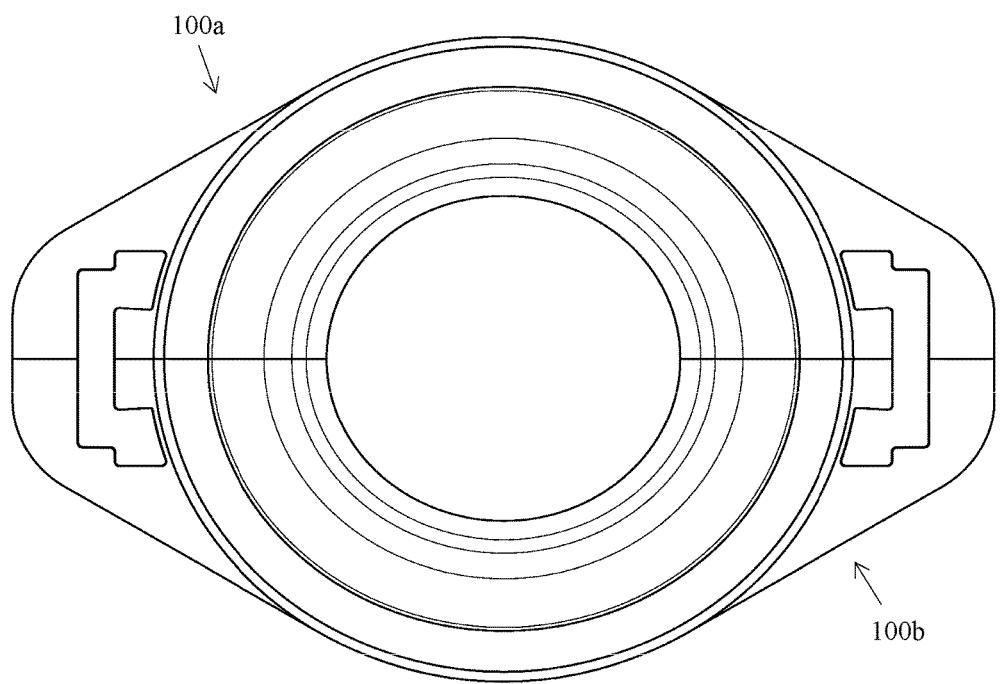
Figure 4G:
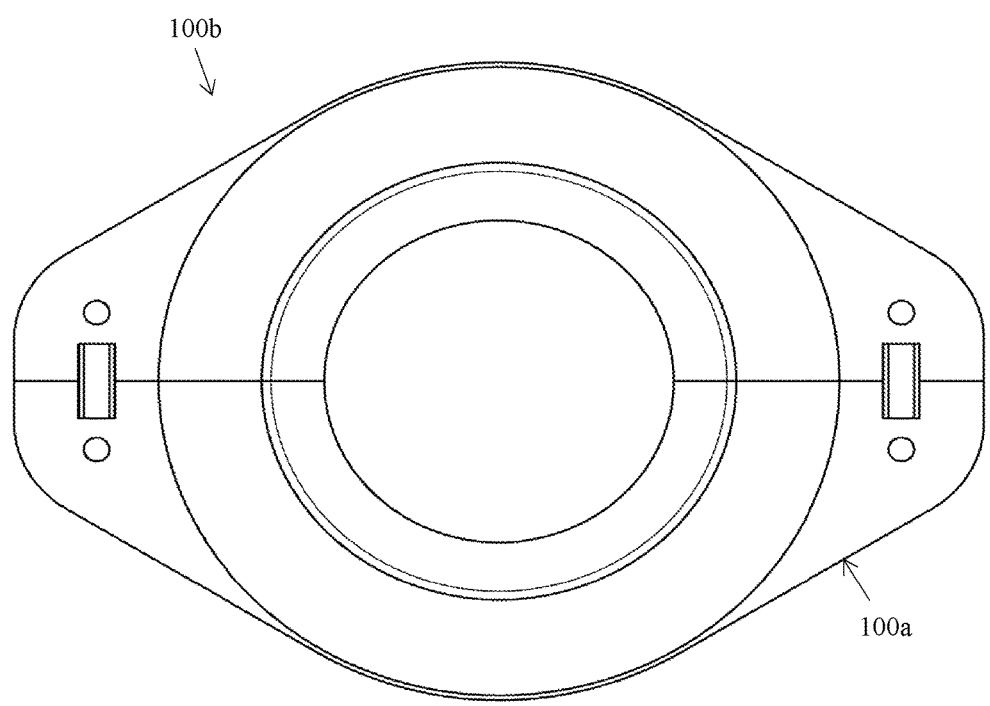
Figure 4H:
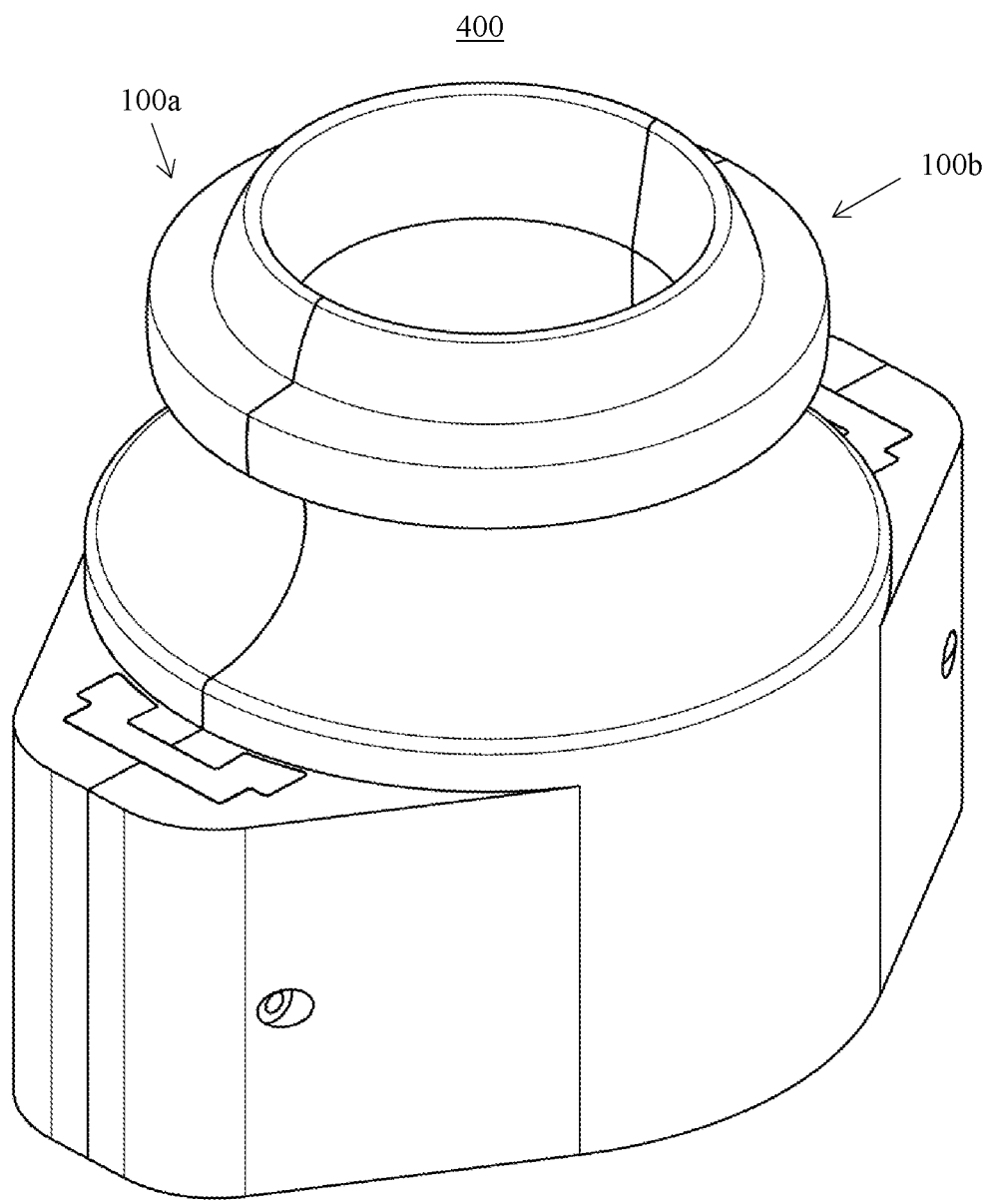
Figure 4I:
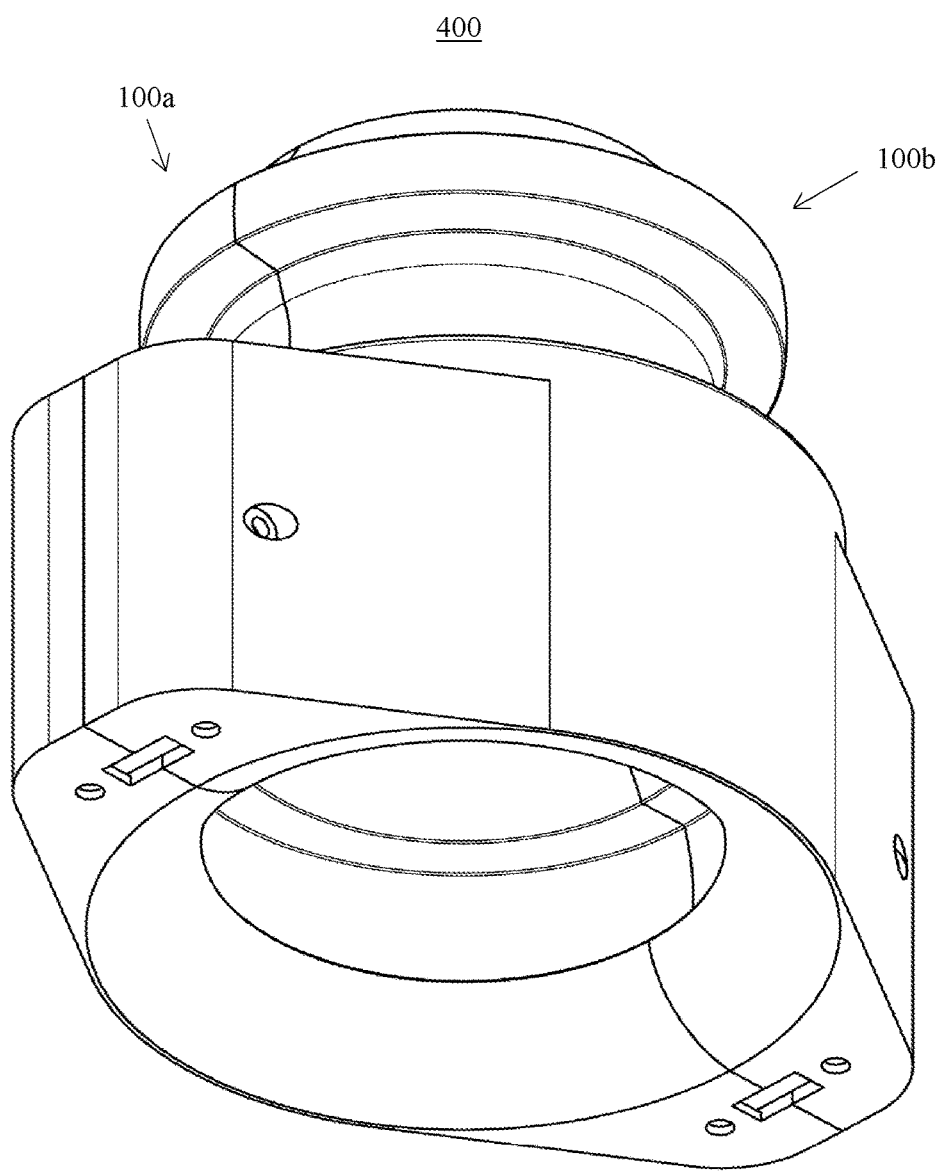

Continuing, FIG. 4B shows insertion of a first non-metallic clip 200a and optional retention screws 300a, 300b as part of assembly of the non-metallic vertebrae bend restrictor (partially shown) in accordance with one or more embodiments of the present invention. After joining first non-metallic member 100a to second non-metallic member 100b, a first non-metallic clip 200a may be inserted into a first non-metallic clip receiver 410a. Once clip 200a is fully inserted, one or more optional clip retention screws 300a, 300b may be secured through boss retention screw receivers 175 into optional clip retention screw receiver 225 of clip 200a. Continuing, FIG. 4C shows insertion of a second non-metallic clip 200b and optional retention screws 300c, 300d as part of assembly of the non-metallic vertebrae bend restrictor (partially shown) in accordance with one or more embodiments of the present invention. A second non-metallic clip 200b may be inserted into a second non-metallic clip receiver 410b. Once clip 200b is fully inserted, one or more optional clip retention screws 300c, 300d may be secured through boss retention screw receivers 175 into optional clip retention screw receiver 225 of clip 200a. Continuing, FIG. 4D shows a front or rear facing elevation view of the assembled non-metallic vertebrae bend restrictor 400 in accordance with one or more embodiments of the present invention. Continuing, FIG. 4E shows a left-side or right-side facing elevation view of the assembled non-metallic vertebrae bend restrictor 400 in accordance with one or more embodiments of the present invention. Continuing, FIG. 4F shows a top plan view of the assembled non-metallic vertebrae bend restrictor 400 in accordance with one or more embodiments of the present invention. Continuing, FIG. 4G shows a bottom plan view of the assembled non-metallic vertebrae bend restrictor 400 in accordance with one or more embodiments of the present invention. Continuing, FIG. 4H shows a top-facing isometric view of the assembled non-metallic vertebrae bend restrictor 400 in accordance with one or more embodiments of the present invention. Continuing, FIG. 4I shows a bottom-facing isometric view of the assembled non-metallic vertebrae bend restrictor 400 in accordance with one or more embodiments of the present invention.

Figure 5A:
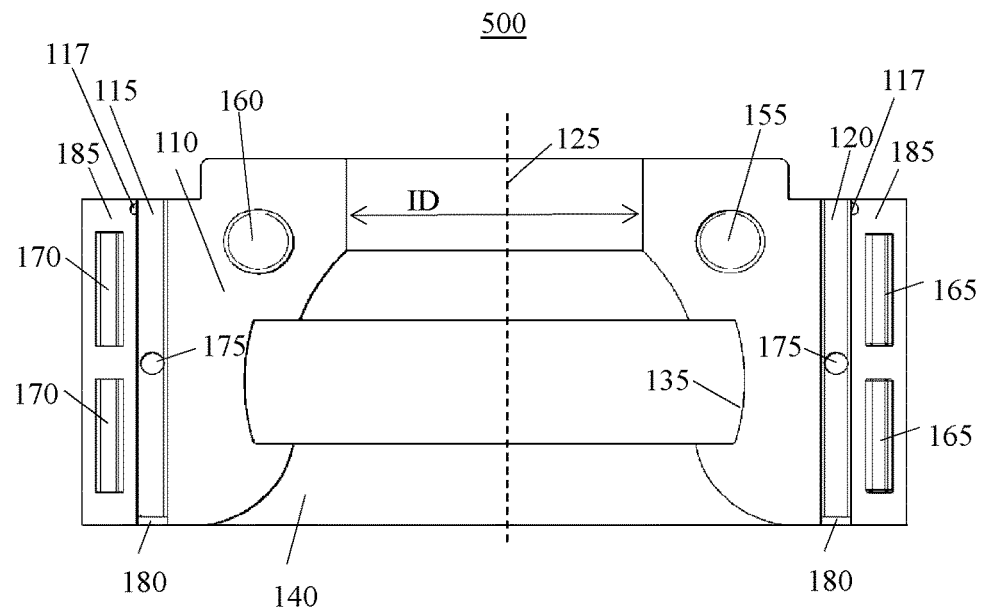
FIGS. 5A, 5B, 5C, 5D, 5E, 5F, 5G, and 5H show an interior-facing elevation view, an exterior-facing elevation view, a left-side elevation view, a right-side elevation view, a top plan view, a bottom plan view, an interior-facing isometric view, and an exterior-facing isometric view respectively of a non-metallic member of a non-metallic vertebrae end piece in accordance with one or more embodiments of the present invention.

FIG. 5A shows an interior-facing elevation view of a non-metallic member 500 of a non-metallic vertebrae end piece (600 of FIG. 6) in accordance with one or more embodiments of the present invention. Two identical or substantially identical non-metallic members 500 may be joined together around a flexible conduit (not shown) and secured to one another with a non-metallic clip connection system (not shown) to form a non-metallic vertebrae end piece (600 of FIG. 6) in accordance with one or more embodiments of the present invention. One of ordinary skill in the art will recognize that two substantially identical non-metallic members 500 may vary somewhat from one another in shape, size, and markings based on an application or design in accordance with one or more embodiments of the present invention.

In certain embodiments, a plurality of non-metallic vertebrae bend restrictors (400 of FIG. 4) may be used to encase and protect a flexible conduit (not shown). At a terminal end of the non-metallic vertebrae bend restrictor installation, a non-metallic vertebrae end piece (600 of FIG. 6) may be used to create an end cap termination. One of ordinary skill in the art will recognize that non-metallic member 500 of a non-metallic vertebrae end piece (600 of FIG. 6) may be substantially identical to non-metallic member (100 of FIG. 1) of a non-metallic vertebrae bend restrictor (400 of FIG. 4) with ball portion (105 of FIG. 1) removed, thus allowing for use of non-metallic end piece (600 of FIG. 6) as an end piece in a chain of non-metallic vertebrae bend restrictors (400 of FIG. 4).

Figure 5B:
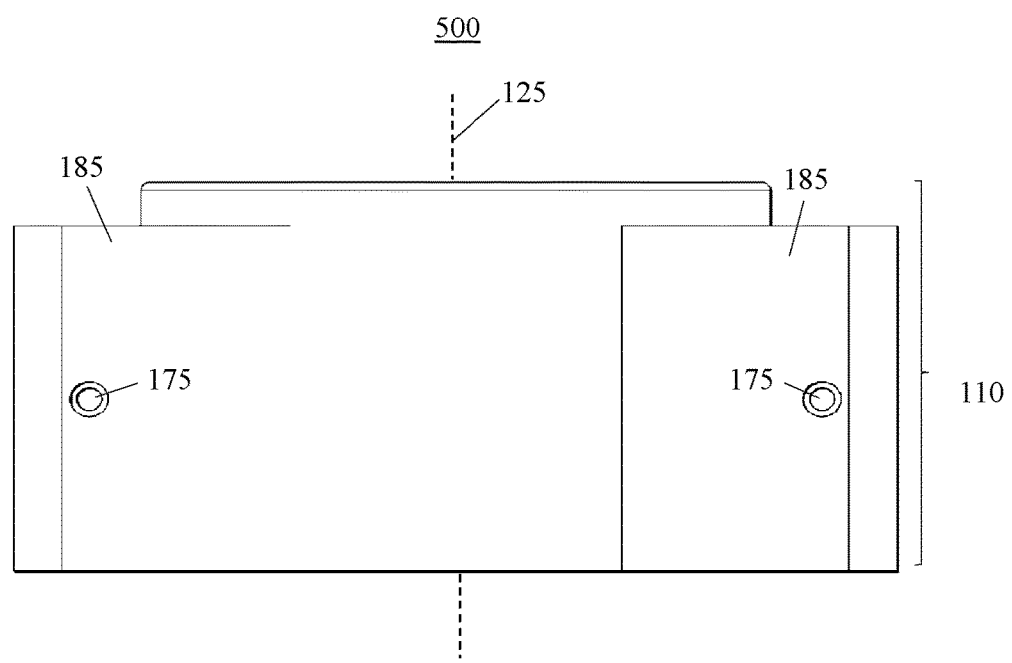
Figures 5C, 5D:
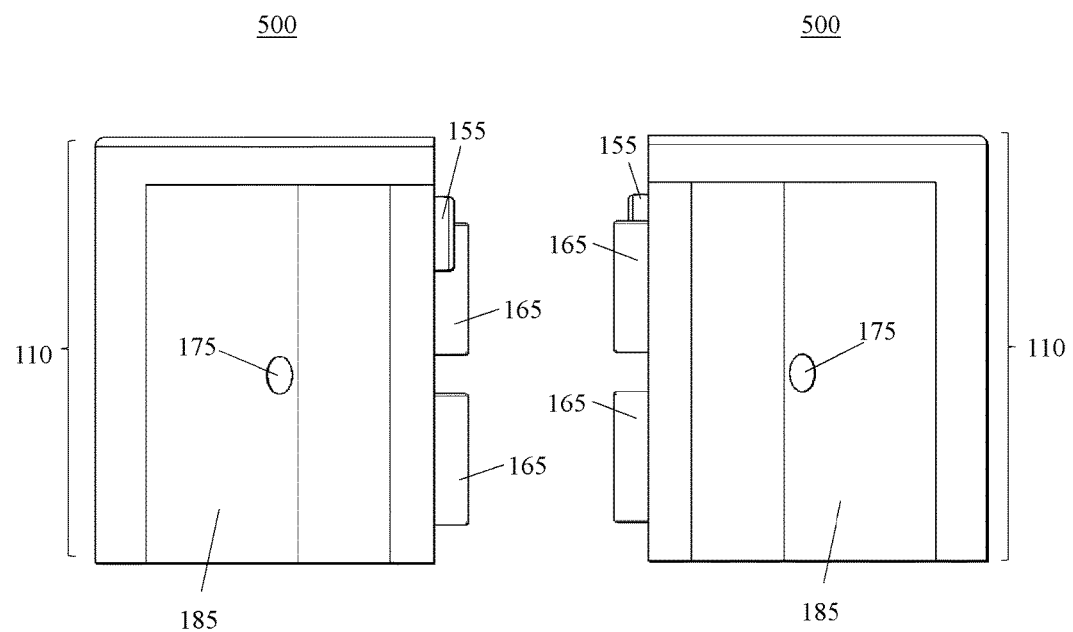

Continuing, FIG. 5B shows an exterior-facing elevation view of a non-metallic member 500 of a non-metallic vertebrae end piece (600 of FIG. 6) in accordance with one or more embodiments of the present invention. Continuing, FIG. 5C shows a left-side elevation view of a non-metallic member 500 of a non-metallic vertebrae end piece (600 of FIG. 6) in accordance with one or more embodiments of the present invention. Continuing, FIG. 5D shows a right-side elevation view of a non-metallic vertebrae end piece (600 of FIG. 6) in accordance with one or more embodiments of the present invention.

Figure 5E:
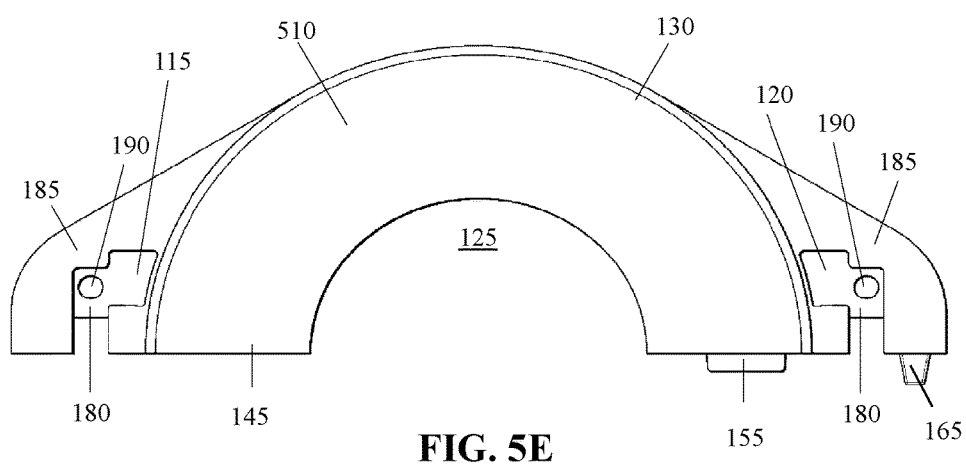
Figure 5F:
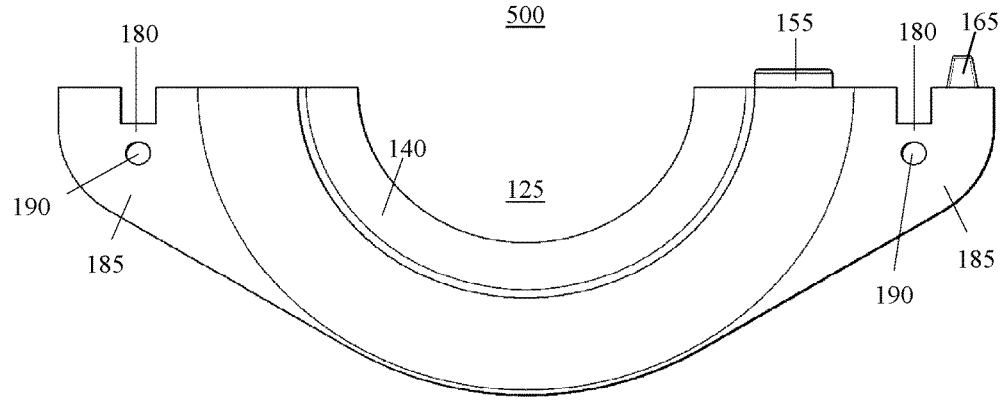

Continuing, FIG. 5E shows a top plan view of a non-metallic member 500 of a non-metallic vertebrae end piece (600 of FIG. 6) in accordance with one or more embodiments of the present invention. Non-metallic member 500 of non-metallic vertebrae end piece (600 of FIG. 6) differs from non-metallic member (100 of FIG. 1) of non-metallic vertebrae bend restrictor in that non-metallic member 500 has a flat planar surface 510 where non-metallic member (100 of FIG. 1) has the ball portion (105 of FIG. 1). Continuing, FIG. 5F shows a bottom plan view of a non-metallic member 500 of a non-metallic vertebrae end piece (600 of FIG. 6) in accordance with one or more embodiments of the present invention.

Figure 5G:
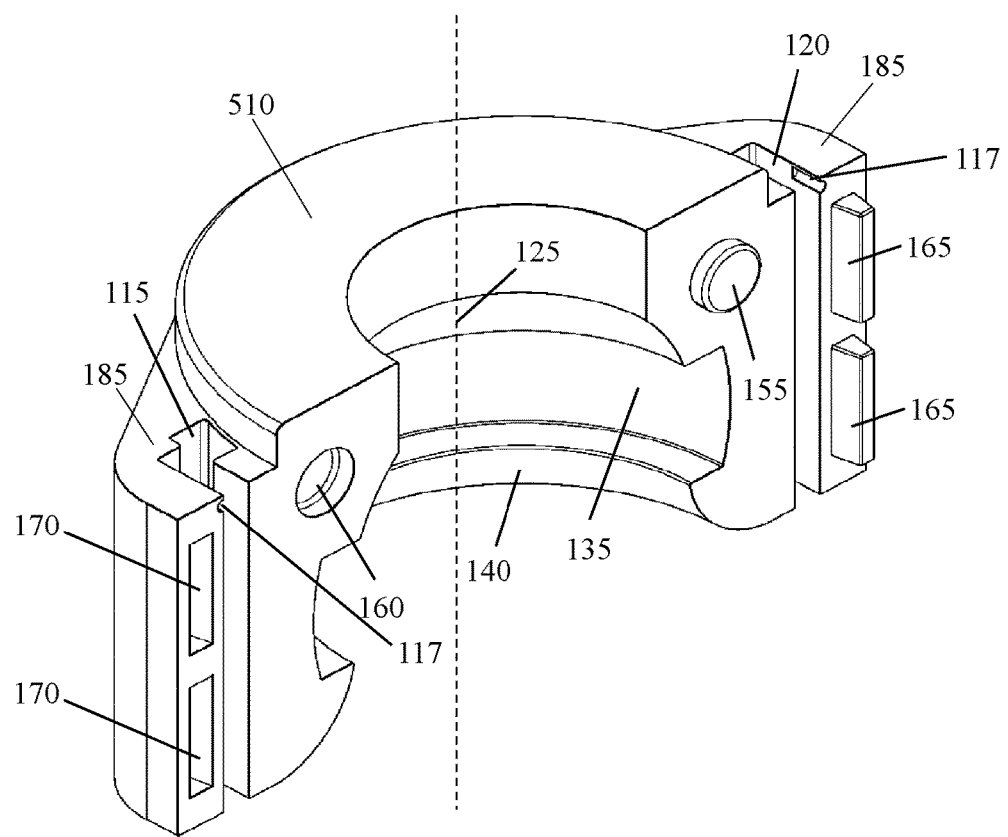
Figure 5H:
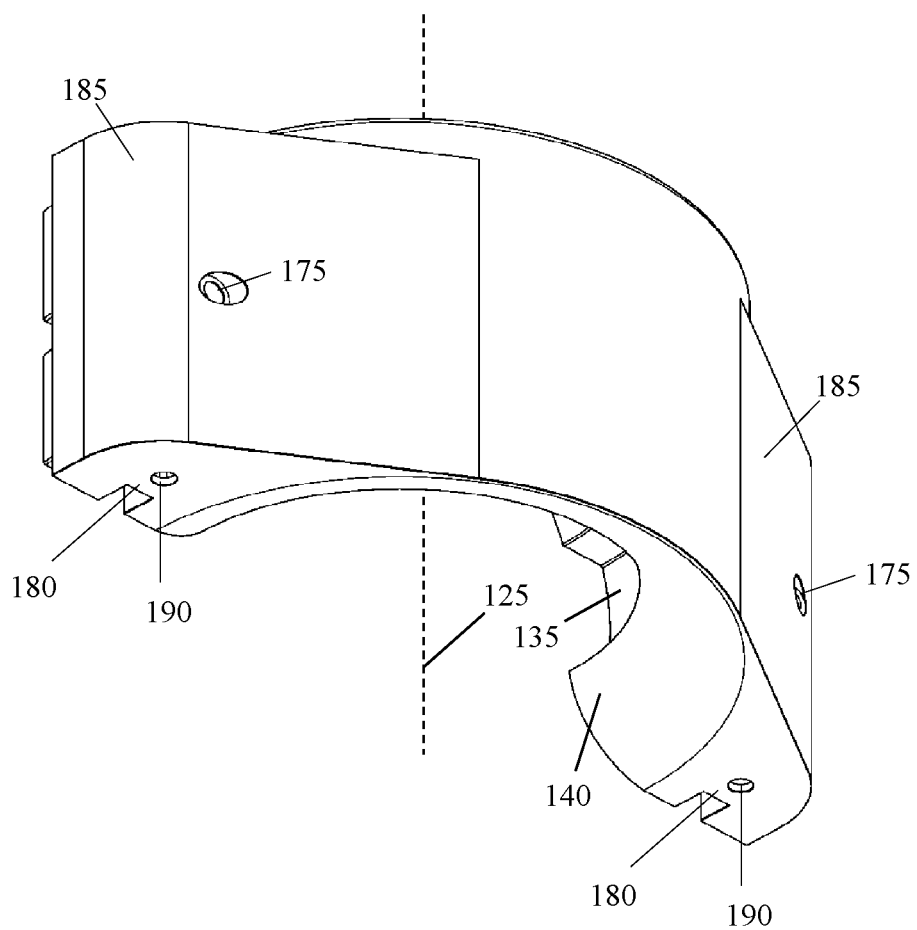

Continuing, FIG. 5G shows an interior-facing isometric view of a non-metallic member 500 of a non-metallic vertebrae end piece (600 of FIG. 6) in accordance with one or more embodiments of the present invention. Continuing, FIG. 5H shows an exterior-facing isometric view of a non-metallic member 500 of a non-metallic vertebrae end piece (600 of FIG. 6) in accordance with one or more embodiments of the present invention.

In certain embodiments, non-metallic member 500 may be composed of a polyurethane polymer. In other embodiments, non-metallic member 500 may be composed of acetyl, high density polypropylene, thermoset plastic, carbon reinforced plastic, thermoset urethane, or fiberglass reinforced urethane. In still other embodiments, non-metallic member 500 may be composed of other non-metallic high modulus materials. One of ordinary skill in the art will recognize that any non-metallic high modulus material suitable for encasing and protecting a flexible conduit (not shown) may be used in accordance with one or more embodiments of the present invention.

Figure 6A:
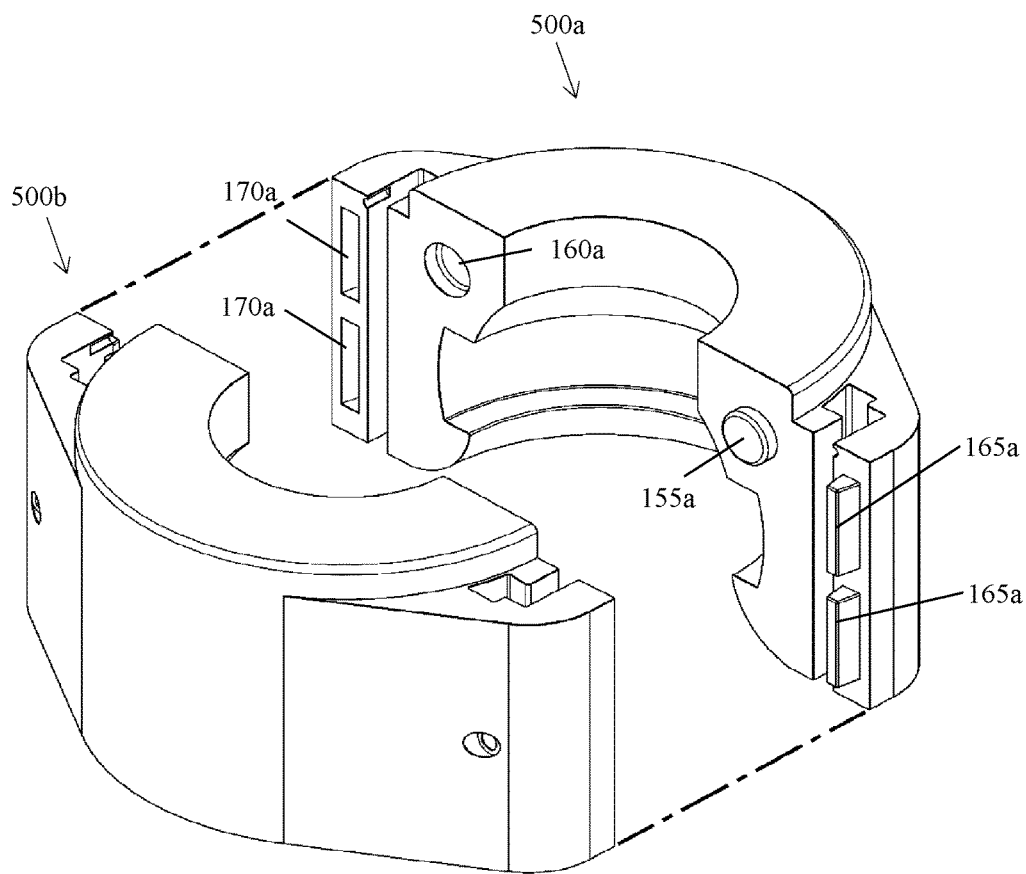
FIGS. 6A, 6B, 6C, and 6D show two non-metallic members of a non-metallic end piece coming together, insertion of a first non-metallic clip and optional retention screws, insertion of a second non-metallic clip and optional retention screws, and a top-facing isometric view assembled of a non-metallic vertebrae end piece in accordance with one or more embodiments of the present invention.

FIG. 6A shows two non-metallic members 500a, 500b of a non-metallic vertebrae end piece (partially shown) coming together during assembly in accordance with one or more embodiments of the present invention. An interior face of a first non-metallic member 500a may face and align with an interior face of a second non-metallic member 500b around a flexible conduit (not shown). Optional socket alignment and shear protrusion 155a of first non-metallic member 500a may align and insert into an optional socket alignment and shear protrusion receiver (not shown) of second non-metallic member 500b. Similarly, an optional socket alignment and shear protrusion (not shown) of second non-metallic member 500b may align and insert into optional socket alignment and shear protrusion receiver 160a of first non-metallic—member 500a. One or more optional boss alignment and shear protrusions 165a of first non-metallic member 500a may align and insert into one or more optional boss alignment and shear protrusion receivers (not shown) of second non-metallic member 500b. Similarly, one or more optional boss alignment and shear protrusions (not shown) of second non-metallic member 500b may align and insert into one or more optional boss alignment and shear protrusion receivers 170a of first non-metallic member 500a. Optional socket alignment and shear protrusions 155a and optional boss alignment and shear protrusions 165a may take shear loads once assembled.

Figure 6B:
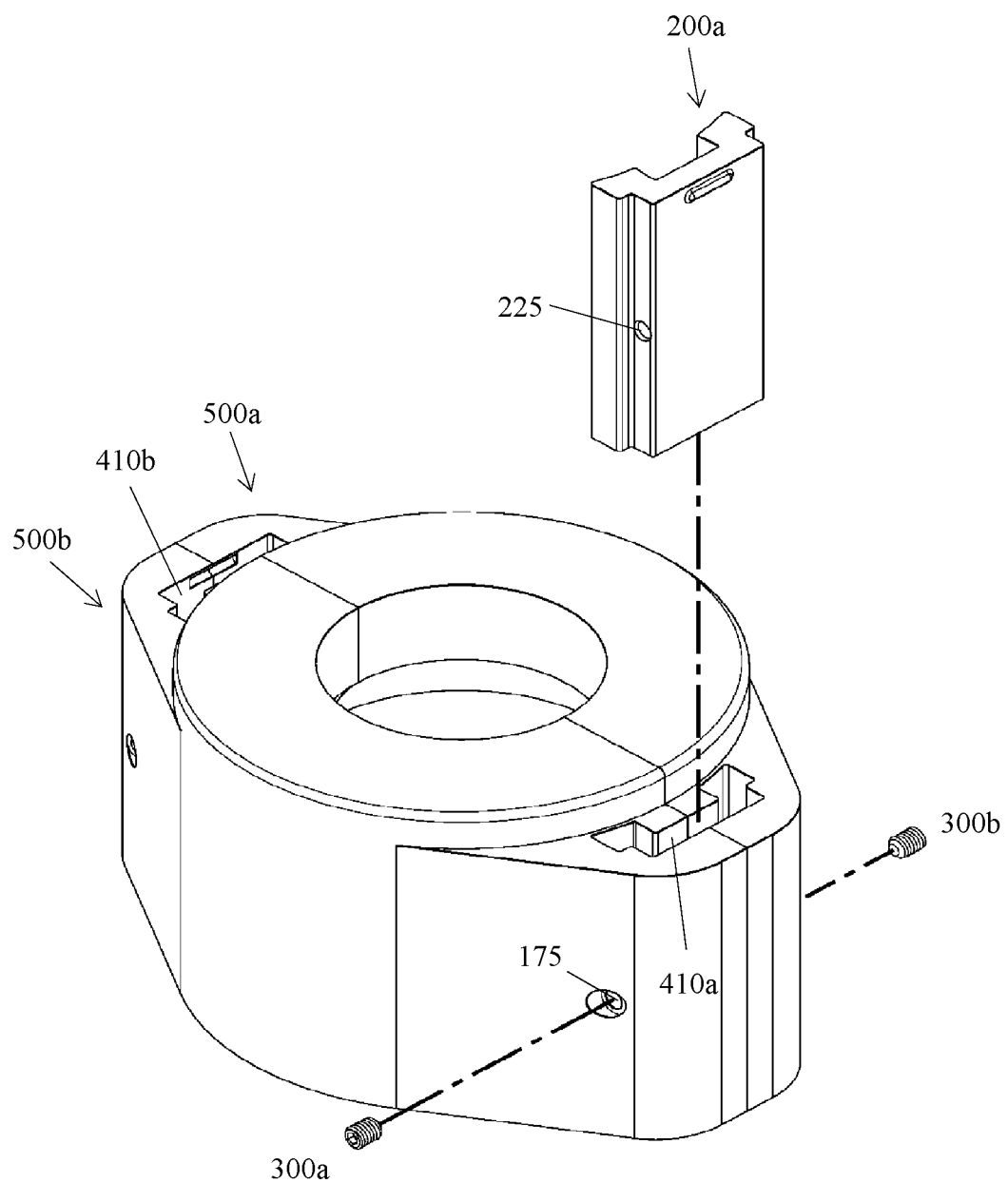
Figure 6C:
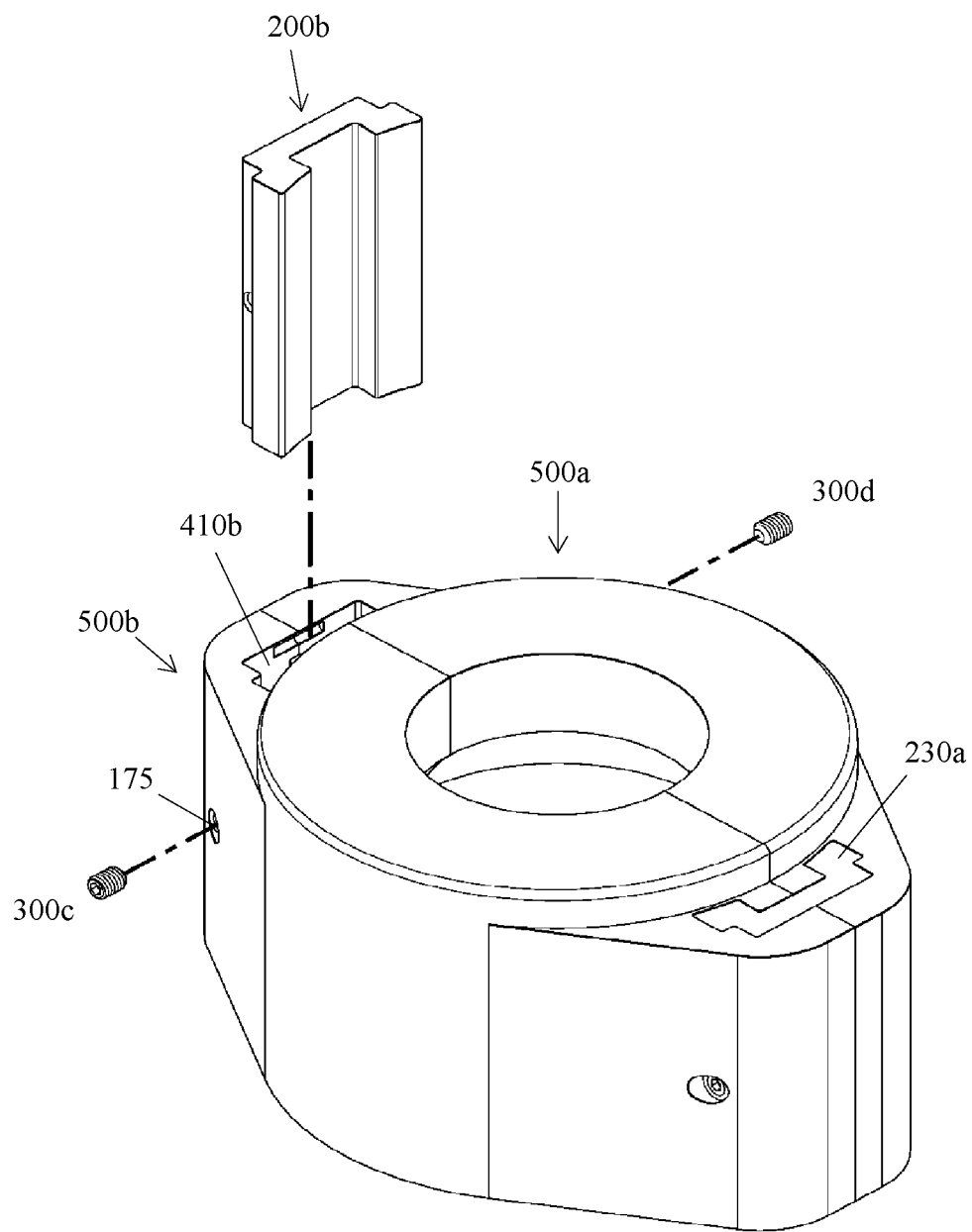
Figure 6D:
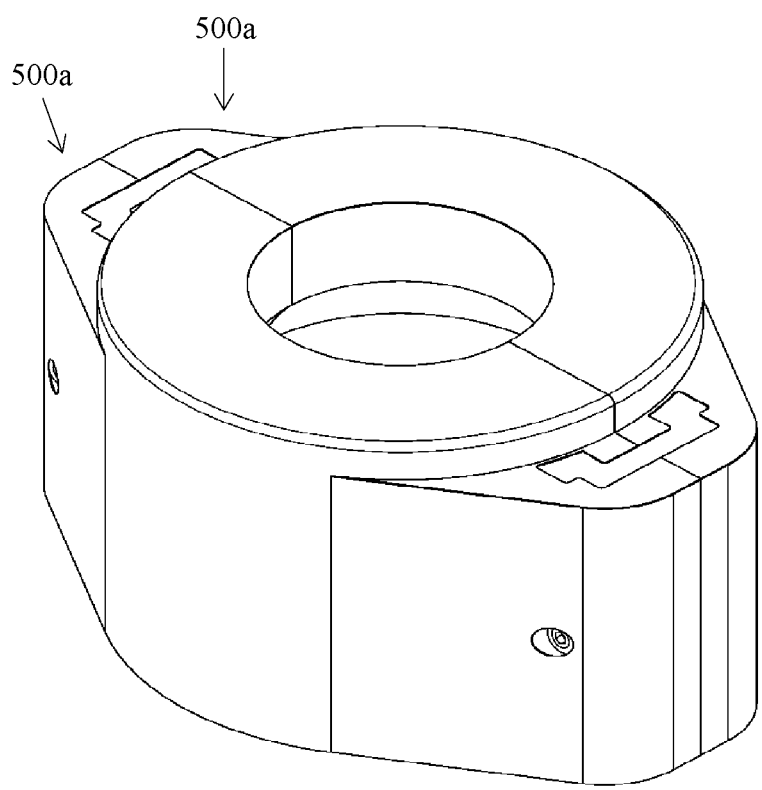

Continuing, FIG. 6B shows insertion of a first non-metallic clip 200a and optional retention screws 300a, 300b as part of assembly of the non-metallic vertebrae end piece (partially shown) in accordance with one or more embodiments of the present invention. After joining first non-metallic member 500a to second non-metallic member 500b, a first non-metallic clip 200a may be inserted into a first non-metallic clip receiver 410a. Once clip 200a is fully inserted, one or more optional clip retention screws 300a, 300b may be secured through boss retention screw receivers 175 into optional clip retention screw receiver 225 of clip 200a. Continuing, FIG. 6C shows insertion of a second non-metallic clip 200b and optional retention screws 300c, 300d as part of assembly of the non-metallic vertebrae end piece (partially shown) in accordance with one or more embodiments of the present invention. A second non-metallic clip 200b may be inserted into a second non-metallic clip receiver 410b. Once clip 200b is fully inserted, one or more optional clip retention screws 300c, 300d may be secured through boss retention screw receivers 175 into optional clip retention screw receiver 225 of clip 200a. Continuing, FIG. 6D shows a top-facing isometric view of the assembled non-metallic vertebrae end piece 600 in accordance with one or more embodiments of the present invention.

Figure 7:
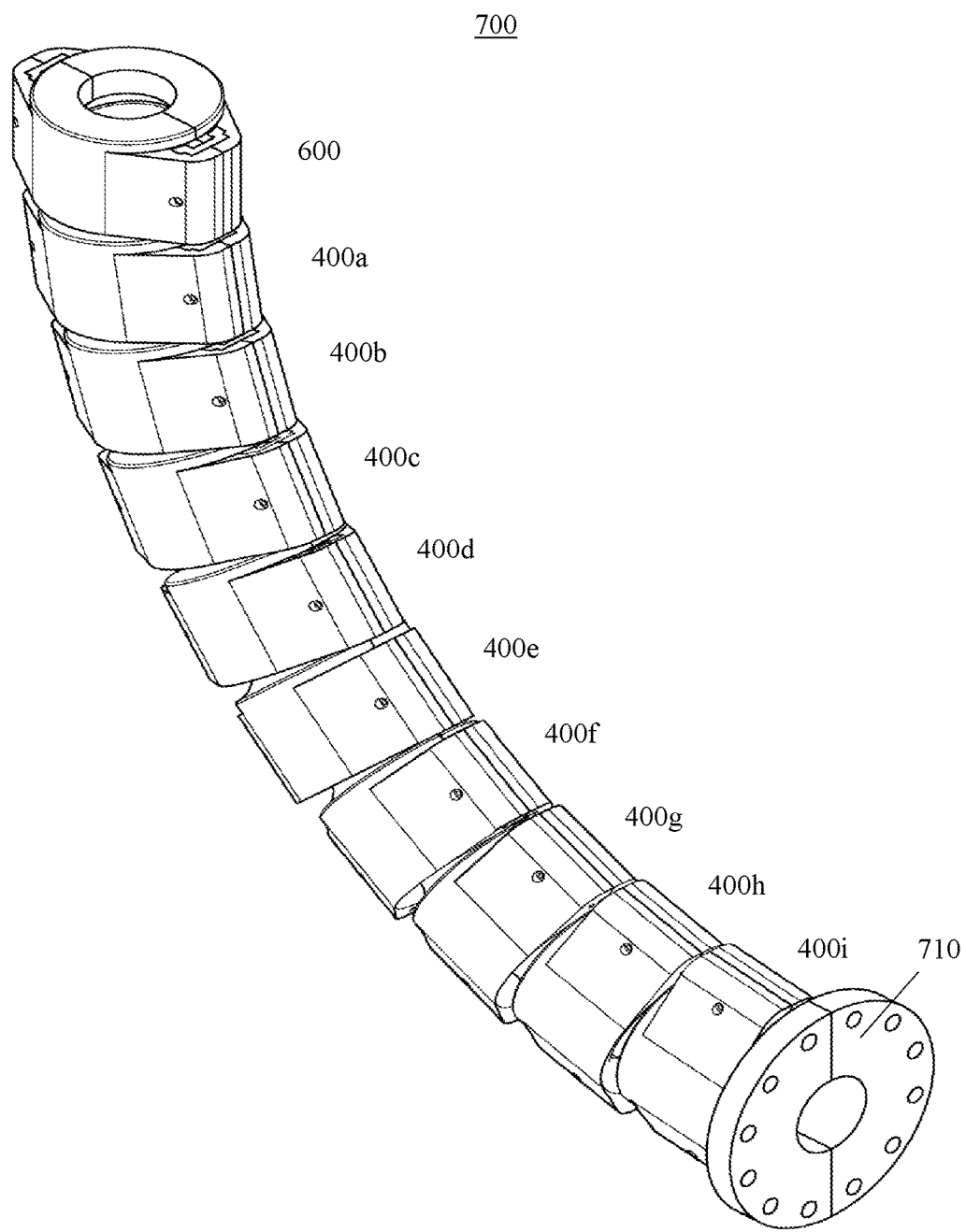
FIG. 7 shows an environmental view of a non-metallic vertebrae bend restrictor installation in accordance with one or more embodiments of the present invention.

FIG. 7 shows an environmental view of a non-metallic vertebrae bend restrictor installation 700 in accordance with one or more embodiments of the present invention. A number of vertebrae bend restrictors 400a-400i may be used to encase a flexible conduit (not shown). In this view, a plurality of vertebrae bend restrictors 400a-400i are shown with a non-metallic vertebrae end piece 600 that creates an end cap termination disposed on a first distal end. On a second distal end, a flange 710 may be used to provide connectivity. Each adjacent pair of vertebrae bend restrictors 400 restrict the amount of bend between the vertebrae and together as an installation 700 allow for the bending of the flexible conduit (not shown) without bending any particular segment of the flexible conduit (not shown) beyond its rated amount of bend radius.

One of ordinary skill in the art will recognize that the non-metallic clip connection system of the non-metallic vertebrae bend restrictor (400 of FIG. 4) and the non-metallic vertebrae end piece (600 of FIG. 6) may be used in other applications in which non-metallic members of different shapes and sizes may be joined together with one or more non-metallic clips.

Figure 8A:
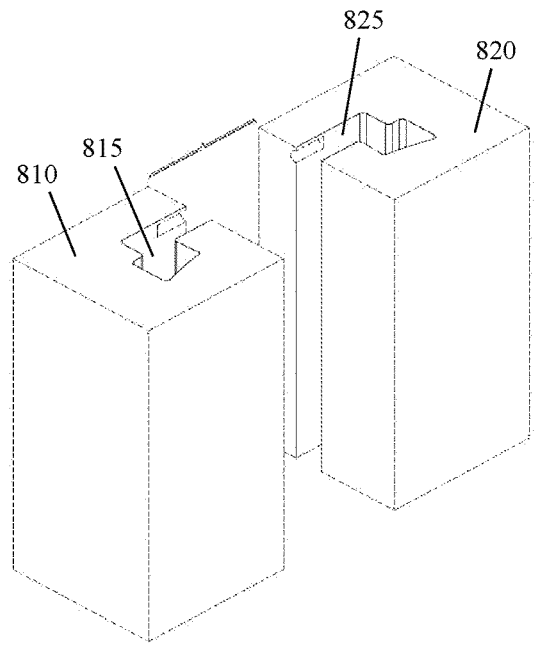
FIGS. 8A, 8B, 8C, 8D, and 8E show two non-metallic members of a non-metallic clip connection system coming together, insertion of a first non-metallic clip, insertion of a second non-metallic clip, and a top-facing isometric view assembled of a non-metallic clip connection system in accordance with one or more embodiments of the present invention.

FIG. 8A shows a first non-metallic member 810 comprising a first portion 815 of a non-metallic clip receiver (not independently shown) and a second non-metallic member 820 comprising a second portion 825 of the non-metallic clip receiver (not independently shown). The shape and size of the exterior of the first non-metallic member 810, shown in dashed lines, may vary based on an application or design. Similarly, the shape and size of the exterior of the second non-metallic member 820, also shown in dashed lines, may vary based on an application or design. As such, one or more non-metallic clip receivers (not independently illustrated) and one or more non-metallic clips (not shown) may be used to join together any non-metallic members (not shown) of any shape or size.

Figure 8B:
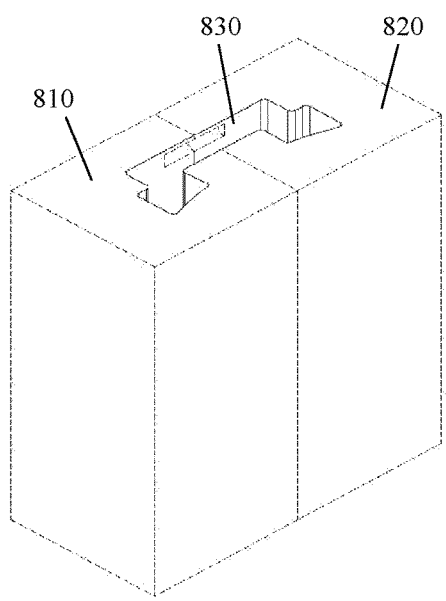
Figure 8C:
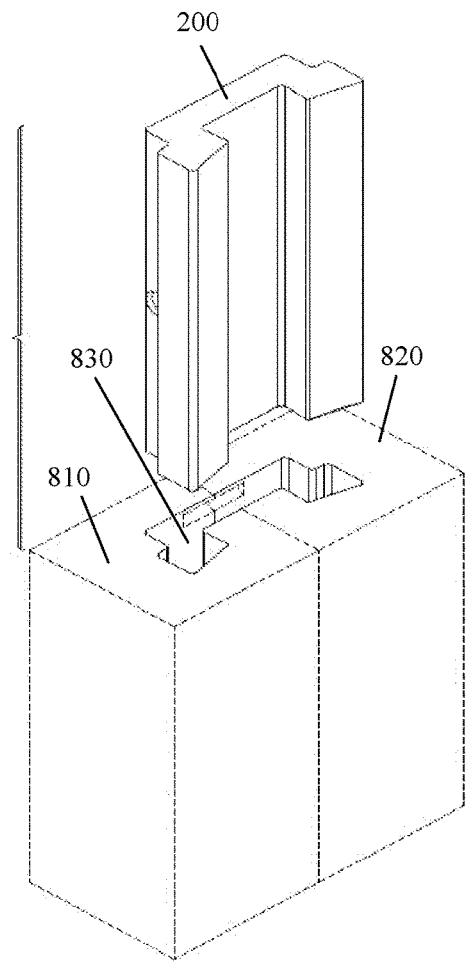
Figure 8D:
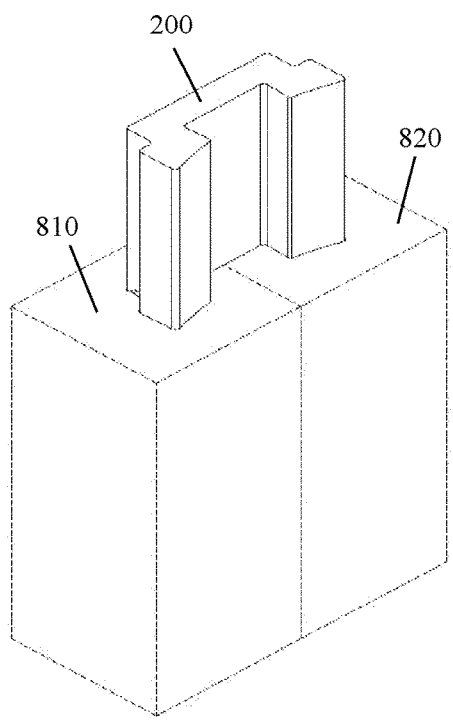
Figure 8E:
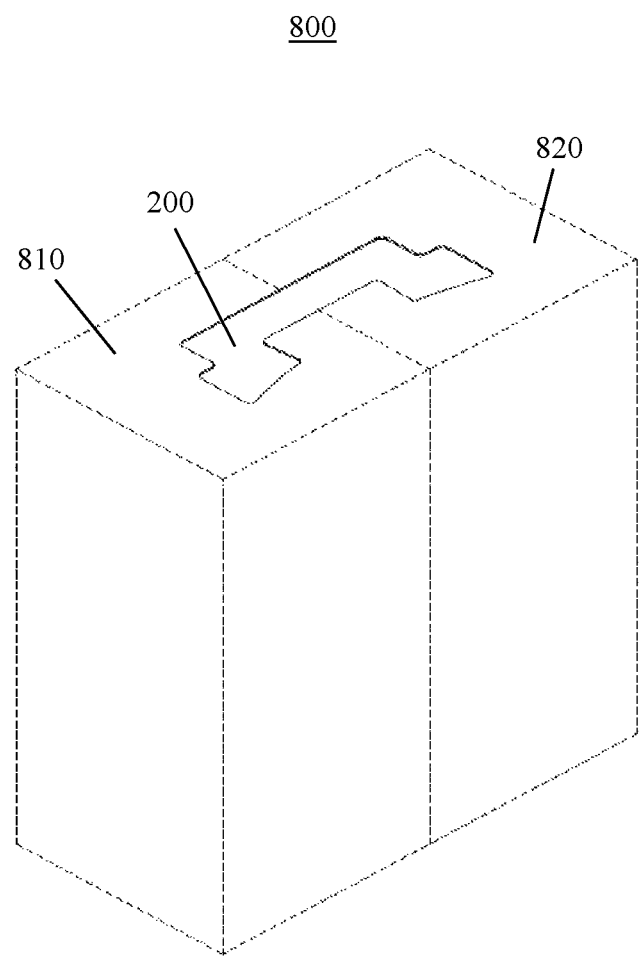

Continuing, FIG. 8B shows first non-metallic member 810 brought together and aligned with second non-metallic member 820. The first portion (815 of FIG. 8A) of first non-metallic member 810 and the second portion (825 of FIG. 8A) of second non-metallic member 820 form a non-metallic clip receiver 830 configured to receive a non-metallic clip (not shown). The non-metallic clip receiver 830 may have a shape and size configured to receive a non-metallic clip (not shown) with an interference fit. Continuing, FIG. 8C shows a non-metallic clip 200 prior to insertion into the non-metallic clip receiver 830 formed by first non-metallic member 810 and second non-metallic member 820. Continuing, FIG. 8D shows the non-metallic clip 200 being inserted into the non-metallic clip receiver 830. Continuing, FIG. 8E shows non-metallic clip 200 fully inserted into the non-metallic clip receiver 830 joining first non-metallic member 810 to second non-metallic member 820. One of ordinary skill in the art will recognize that one or more non-metallic clips 200 may be used to connect two or more non-metallic members, whose shape and size may vary, in accordance with one or more embodiments of the present invention.

Advantages of one or more embodiments of the present invention may include one or more of the following:

In one or more embodiments of the present invention, a non-metallic vertebrae bend restrictor, a non-metallic vertebrae end piece, and a non-metallic clip connection system does not include any metal content and is not subject to corrosion.

In one or more embodiments of the present invention, a non-metallic vertebrae bend restrictor, a non-metallic vertebrae end piece, and a non-metallic clip connection system uses a non-metallic clip connection system that does not require coated metal fasteners or cathodic protection.

In one or more embodiments of the present invention, a non-metallic vertebrae bend restrictor, a non-metallic vertebrae end piece, and a non-metallic clip connection system eliminates the need for specialized installation tools, including those that require specific torque settings or installation procedures.

In one or more embodiments of the present invention, a non-metallic vertebrae bend restrictor, a non-metallic vertebrae end piece, and a non-metallic clip connection system requires fewer parts and is less expensive to manufacture than conventional vertebrae bend restrictors. The larger the inner diameter of the vertebrae bend restrictor, the larger the cost savings as the clip connection system volume is more relevant at smaller inner diameters.

In one or more embodiments of the present invention, a non-metallic vertebrae bend restrictor, a non-metallic vertebrae end piece, and a non-metallic clip connection system is less complex and less expensive to install than conventional vertebrae bend restrictors using bolts.

In one or more embodiments of the present invention, a non-metallic vertebrae bend restrictor, a non-metallic vertebrae end piece, and a non-metallic clip connection system reduces or eliminates lost parts during installation because clips can be partially inserted with ease and held in place during shipment and while installation is underway.

In one or more embodiments of the present invention, a non-metallic vertebrae bend restrictor, a non-metallic vertebrae end piece, and a non-metallic clip connection system reduces or eliminates the maintenance associated with conventional vertebrae bend restrictors.

In one or more embodiments of the present invention, a non-metallic vertebrae bend restrictor, a non-metallic vertebrae end piece, and a non-metallic clip connection system reduces the number of components required as compared to conventional vertebrae bend restrictors.

In one or more embodiments of the present invention, a non-metallic vertebrae bend restrictor, a non-metallic vertebrae end piece, and a non-metallic clip connection system provide improved reliability over conventional vertebrae bend restrictors, end pieces, and connection systems.

In one or more embodiments of the present invention, a non-metallic vertebrae bend restrictor, a non-metallic vertebrae end piece, and a non-metallic clip connection system provide the same or improved functionality over conventional vertebrae bend restrictors, end pieces, and connection systems.

In one or more embodiments of the present invention, a non-metallic vertebrae bend restrictor, a non-metallic vertebrae end piece, and a non-metallic clip connection system may be used in offshore energy applications.

In one or more embodiments of the present invention, a non-metallic vertebrae bend restrictor, a non-metallic vertebrae end piece, and a non-metallic clip connection system may be used in onshore energy applications.

In one or more embodiments of the present invention, a non-metallic vertebrae bend restrictor, a non-metallic vertebrae end piece, and a non-metallic clip connection system may be used in wind farm applications.

In one or more embodiments of the present invention, a non-metallic vertebrae bend restrictor, a non-metallic vertebrae end piece, and a non-metallic clip connection system may be used in submarine antenna applications.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A non-metallic vertebrae bend restrictor comprising:
   a first non-metallic member comprising
      a first half of a ball portion,
      a first half of a socket portion,
      a first half of a first non-metallic clip receiver,
      a first half of a second non-metallic clip receiver, and
      a first half of a cavity;
   a second non-metallic member comprising
      a second half of the ball portion,
      a second half of the socket portion,
      a second half of the first non-metallic clip receiver,
      a second half of the second non-metallic clip receiver, and
      a second half of the cavity;
   a first non-metallic clip; and
   a second non-metallic clip,
   wherein the first non-metallic member is secured to the second non-metallic member by a first interference fit between the first non-metallic clip and the first non-metallic clip receiver and a second interference fit between the second non-metallic clip and the second non-metallic clip receiver.

2. The non-metallic vertebrae bend restrictor of claim 1, further comprising:
   a plurality of non-metallic retention screws.

3. The non-metallic vertebrae bend restrictor of claim 1, wherein all edges other than a top face of each of the first non-metallic clip and the second non-metallic clip are beveled or radiused.

4. The non-metallic vertebrae bend restrictor of claim 1, wherein each of the first non-metallic clip and the second non-metallic clip comprise a substantially rectangular base portion, a first longitudinal flared wing portion, and a second longitudinal flared wing portion.

5. The non-metallic vertebrae bend restrictor of claim 4, wherein each of the first non-metallic clip and the second non-metallic clip further comprise a clip retention screw receiver on a side longitudinal face of the substantially rectangular base portion.

6. The non-metallic vertebrae bend restrictor of claim 4, wherein each of the first non-metallic clip and the second non-metallic clip further comprise a clip retention feature disposed on a rear face of the substantially rectangular base portion near a top face.

7. The non-metallic vertebrae bend restrictor of claim 1, wherein the first half of the cavity comprises a first half of a flared portion that extends from the first half of the socket portion to a bottom of the first non-metallic member and a first half of a flared portion that extends from the first half of the ball portion to a top of the first non-metallic member.

8. The non-metallic vertebrae bend restrictor of claim 1, wherein the first non-metallic member further comprises:
   a first ball alignment and shear protrusion extending from an interior face of the first half of the ball portion; and
   a first ball alignment and shear protrusion receiver disposed in the interior face of the first half of the ball portion.

9. The non-metallic vertebrae bend restrictor of claim 1, wherein the second non-metallic member further comprises:
   a second ball alignment and shear protrusion extending from an interior face of the second half of the ball portion; and
   a second ball alignment and shear protrusion receiver disposed in the interior face of the second half of the ball portion.

10. The non-metallic vertebrae bend restrictor of claim 1, wherein the first non-metallic member further comprises:
    a first socket alignment and shear protrusion extending from an interior face of the first half of the socket portion; and
    a first socket alignment and shear protrusion receiver disposed in the interior face of the first half of the socket portion.

11. The non-metallic vertebrae bend restrictor of claim 1, wherein the second non-metallic member further comprises:
    a second socket alignment and shear protrusion extending from an interior face of the second half of the socket portion; and
    a second socket alignment and shear protrusion receiver disposed in the interior face of the second half of the socket portion.

12. The non-metallic vertebrae bend restrictor of claim 1, wherein the first non-metallic member further comprises:
    a first boss alignment and shear protrusion extending from an interior face of a first half of a boss portion; and
    a first boss alignment and shear protrusion receiver disposed on the interior face of the first half of the boss portion.

13. The non-metallic vertebrae bend restrictor of claim 1, wherein the second non-metallic member further comprises:
    a second boss alignment and shear protrusion extending from an interior face of a second half of a boss portion; and
    a second boss alignment and shear protrusion receiver disposed in the interior face of the second half of the boss portion.

14. The non-metallic vertebrae bend restrictor of claim 1, wherein each of the first non-metallic member and the second non-metallic member are comprised of polyurethane, a non-metallic polymer, or a non-metallic material.

15. The non-metallic vertebrae bend restrictor of claim 1, wherein each of the first non-metallic clip and the second non-metallic clip are comprised of polyurethane, a non-metallic polymer, or a non-metallic material.

16. The non-metallic vertebrae bend restrictor of claim 1, wherein the ball portion of each of the first non-metallic member and the second non-metallic member comprise a half of a rib portion.

17. The non-metallic vertebrae bend restrictor of claim 1, wherein the socket portion of each of the first non-metallic member comprises a half of a rib receiver.

18. A non-metallic vertebrae end piece comprising:
   a first non-metallic member comprising
      a first half of a socket portion,
      a first half of a first non-metallic clip receiver,
      a first half of a second non-metallic clip receiver, and
      a first half of a cavity;
   a second non-metallic member comprising
      a second half of the socket portion,
      a second half of the first non-metallic clip receiver,
      a second half of the second non-metallic clip receiver, and
      a second half of the cavity;
   a first non-metallic clip; and
   a second non-metallic clip,
   wherein the first non-metallic member is secured to the second non-metallic member by a first interference fit between the first non-metallic clip and the first non-metallic clip receiver and a second interference fit between the second non-metallic clip and the second non-metallic clip receiver.

19. The non-metallic vertebrae end piece of claim 18, further comprising:
   a plurality of non-metallic retention screws.

20. The non-metallic vertebrae end piece of claim 18, wherein all edges other than a top face of each of the first non-metallic clip and the second non-metallic clip are beveled or radiused.

21. The non-metallic vertebrae end piece of claim 18, wherein each of the first non-metallic clip and the second non-metallic clip comprise a substantially rectangular base portion, a first longitudinal flared wing portion, and a second longitudinal flared wing portion.

22. The non-metallic vertebrae end piece of claim 21, wherein each of the first non-metallic clip and the second non-metallic clip further comprise a clip retention screw receiver on a side longitudinal face of the substantially rectangular base portion.

23. The non-metallic vertebrae end piece of claim 21, wherein each of the first non-metallic clip and the second non-metallic clip further comprise a clip retention feature disposed on a rear face of the substantially rectangular base portion near a top face.

24. The non-metallic vertebrae end piece of claim 18, wherein the first half of the cavity comprises a first half of a flared portion that extends from the first half of the socket portion to a bottom of the first non-metallic member and a first half of a flared portion that extends from the first half of the ball portion to a top of the first non-metallic member.

25. The non-metallic vertebrae end piece of claim 18, wherein the first non-metallic member further comprises:
   a first socket alignment and shear protrusion extending from an interior face of the first half of the socket portion; and
   a first socket alignment and shear protrusion receiver disposed in the interior face of the first half of the socket portion.

26. The non-metallic vertebrae end piece of claim 18, wherein the second non-metallic member further comprises:
   a second socket alignment and shear protrusion extending from an interior face of the second half of the socket portion; and
   a second socket alignment and shear protrusion receiver disposed in the interior face of the second half of the socket portion.

27. The non-metallic vertebrae end piece of claim 18, wherein the first non-metallic member further comprises:
   a first boss alignment and shear protrusion extending from an interior face of a first half of a boss portion; and
   a first boss alignment and shear protrusion receiver disposed on the interior face of the first half of the boss portion.

28. The non-metallic vertebrae end piece of claim 18, wherein the second non-metallic member further comprises:
   a second boss alignment and shear protrusion extending from an interior face of a second half of a boss portion; and
   a second boss alignment and shear protrusion receiver disposed in the interior face of the second half of the boss portion.

29. The non-metallic vertebrae end piece of claim 18, wherein each of the first non-metallic member and the second non-metallic member are comprised of polyurethane, a non-metallic polymer, or a non-metallic material.

30. The non-metallic vertebrae end piece of claim 18, wherein each of the first non-metallic clip and the second non-metallic clip are comprised of polyurethane, a non-metallic polymer, or a non-metallic material.

31. The non-metallic vertebrae end piece of claim 18, wherein the socket portion of each of the first non-metallic member comprises a half of a rib receiver.

* * * * *